June 16, 1925.
J. T. DALTON
1,542,375
ART OF HANDLING AND BUNCHING BAGS
Filed Dec. 16, 1922    11 Sheets-Sheet 1
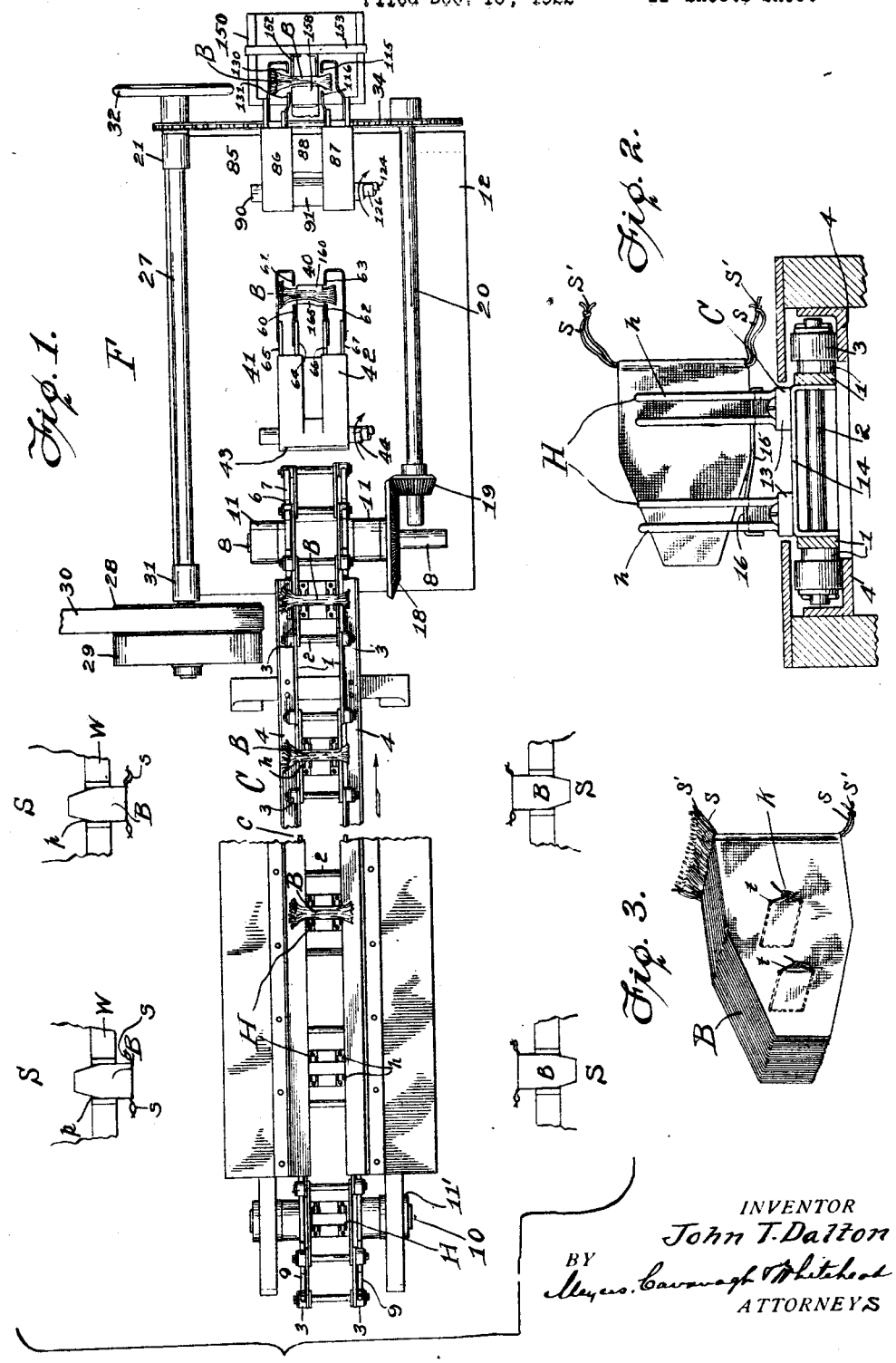

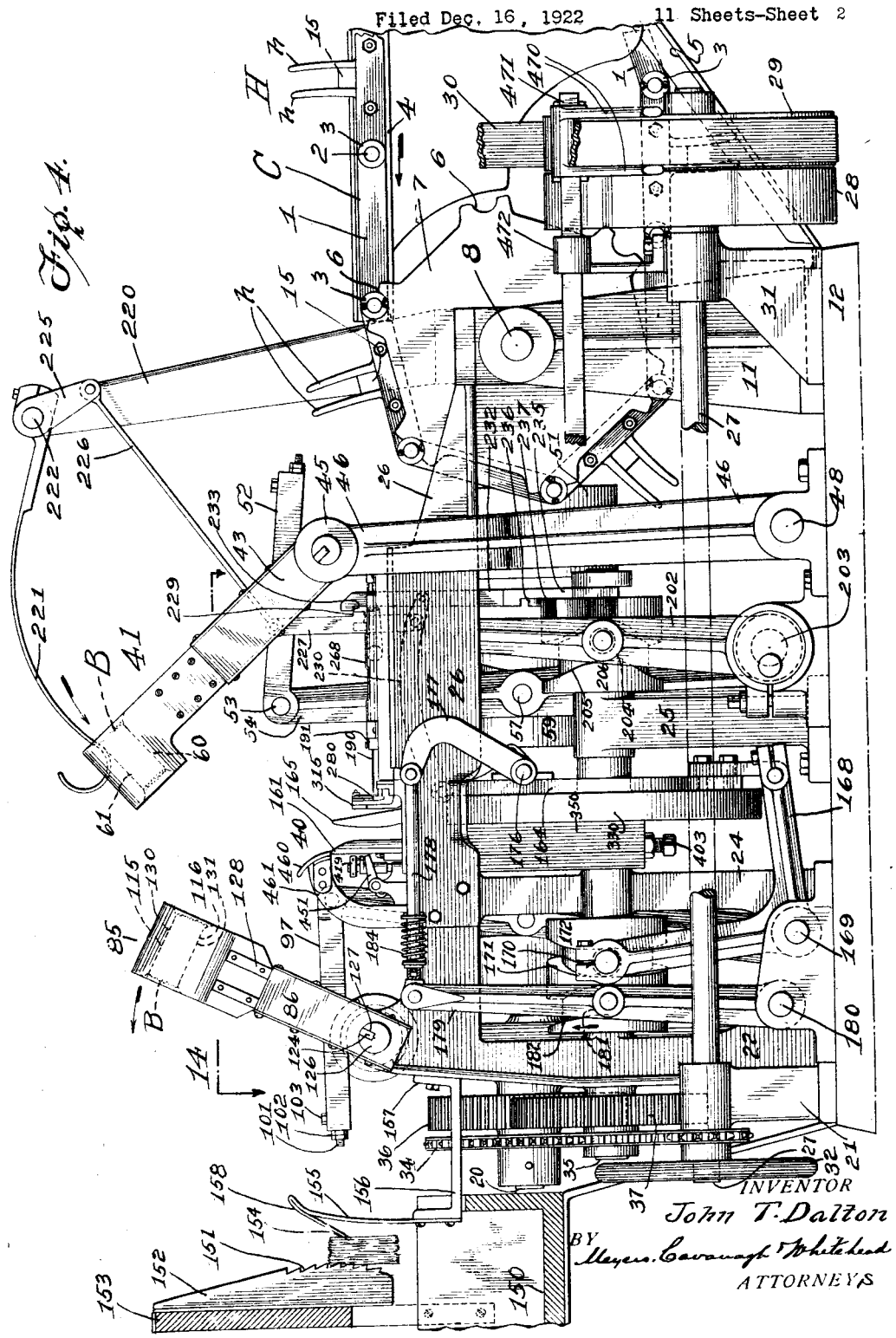

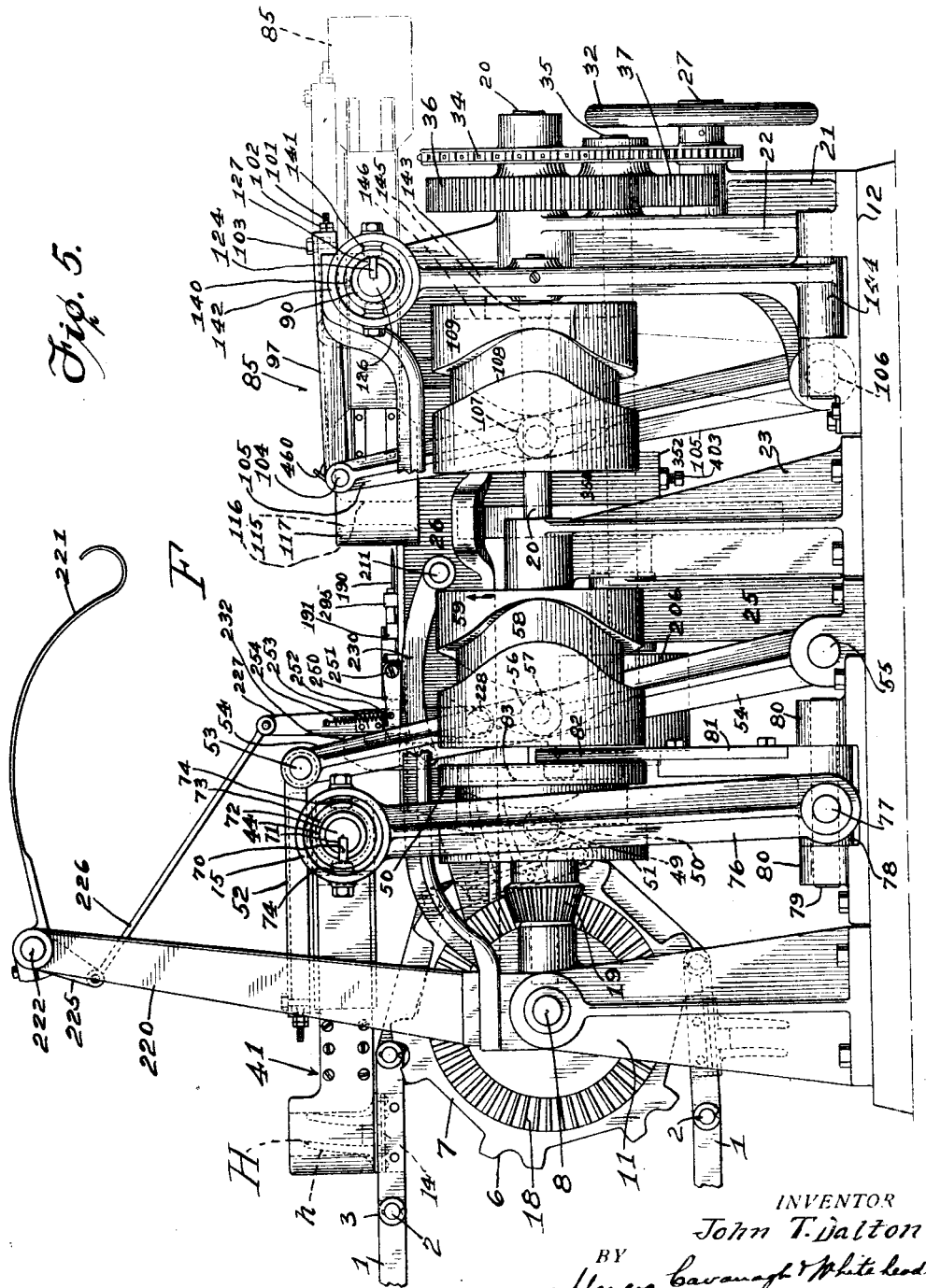

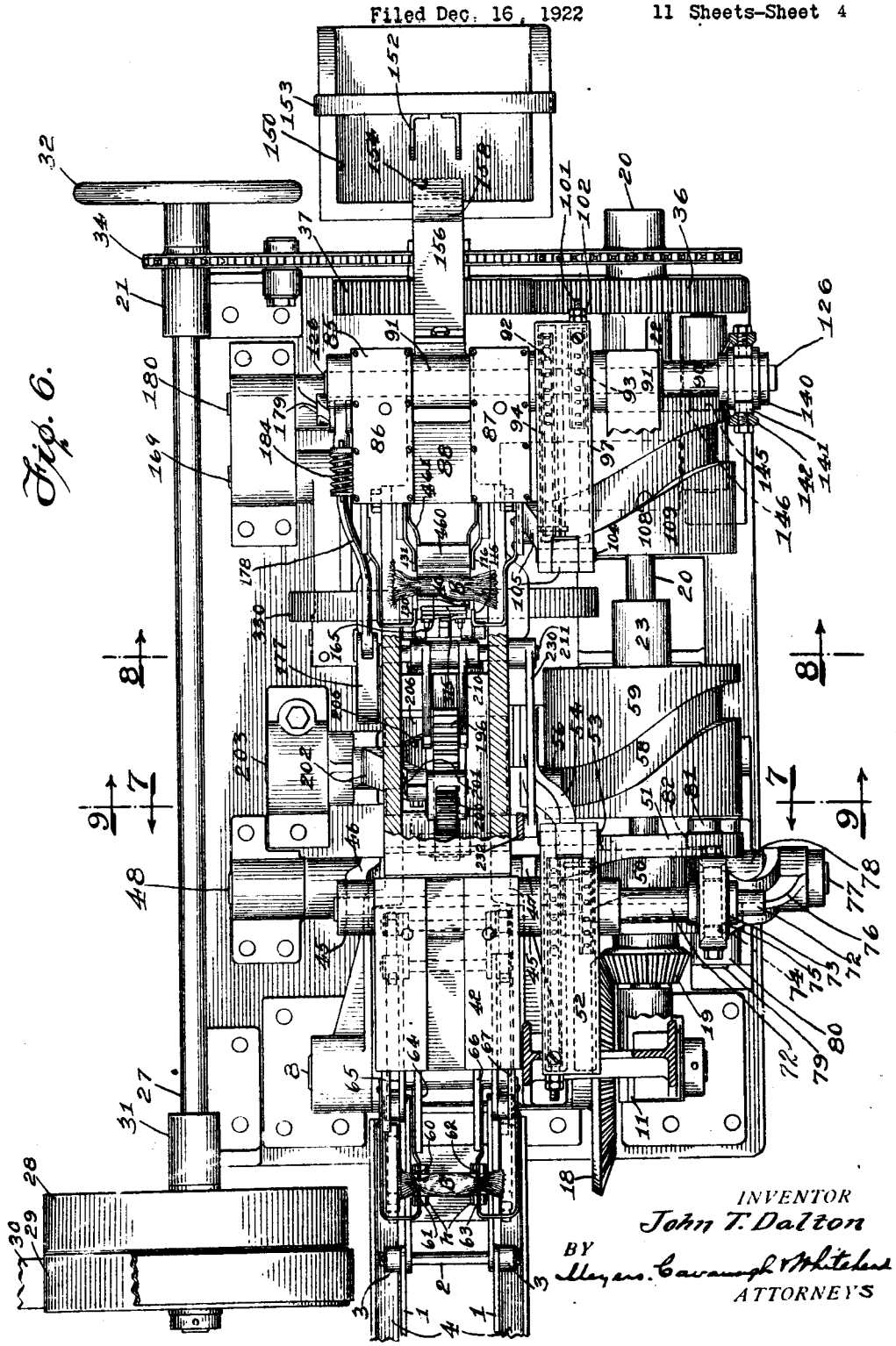

June 16, 1925.

J. T. DALTON 1,542,375

ART OF HANDLING AND BUNCHING BAGS

Filed Dec. 16, 1922      11 Sheets-Sheet 5

INVENTOR
John T. Dalton
BY
Meyers, Cavanagh & Whitehead
ATTORNEYS

June 16, 1925.
J. T. DALTON
ART OF HANDLING AND BUNCHING BAGS
Filed Dec. 16, 1922     11 Sheets-Sheet 6
1,542,375
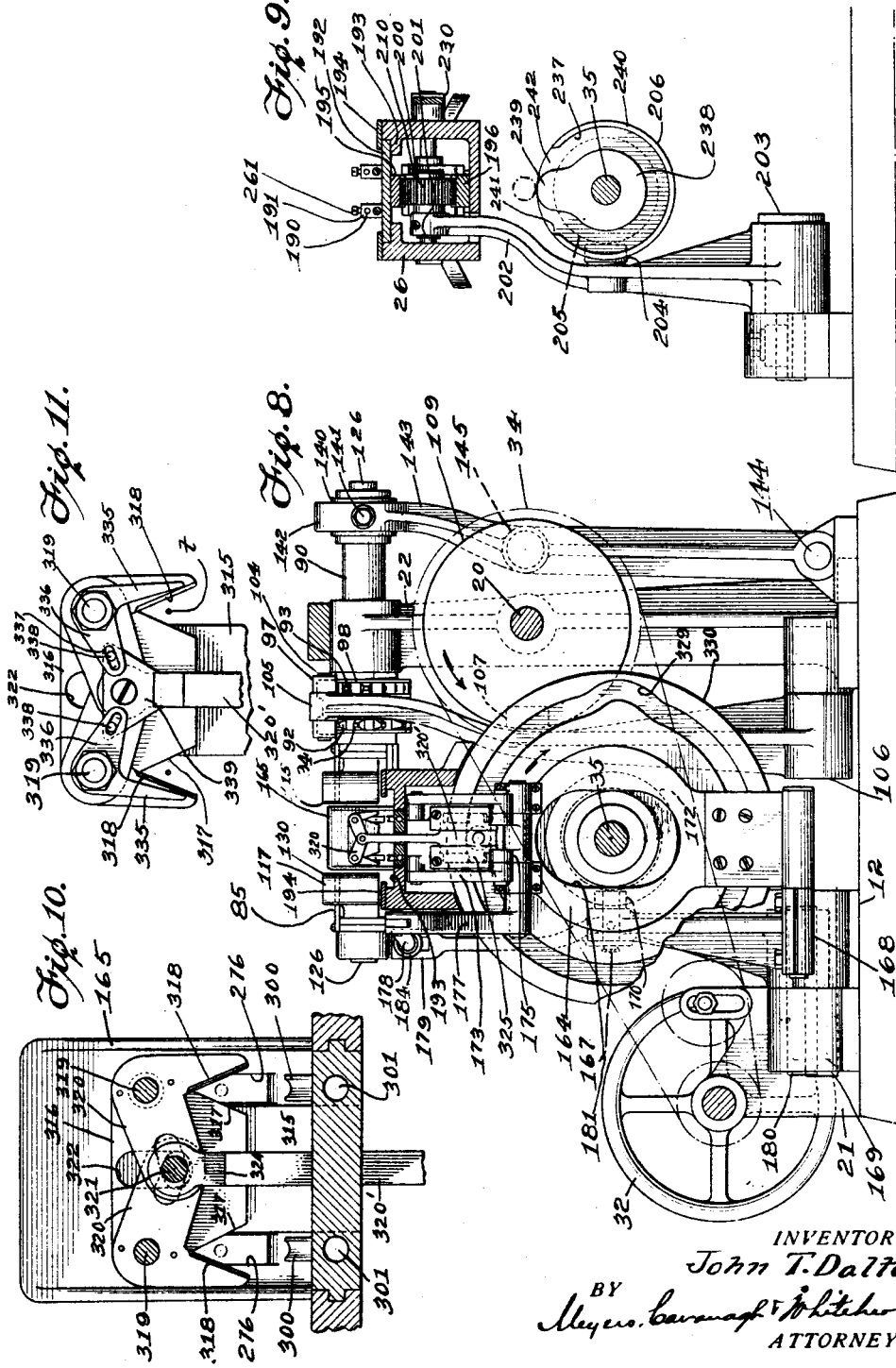
INVENTOR
John T. Dalton
BY
Meyers, Cavanagh & Whitehead
ATTORNEYS

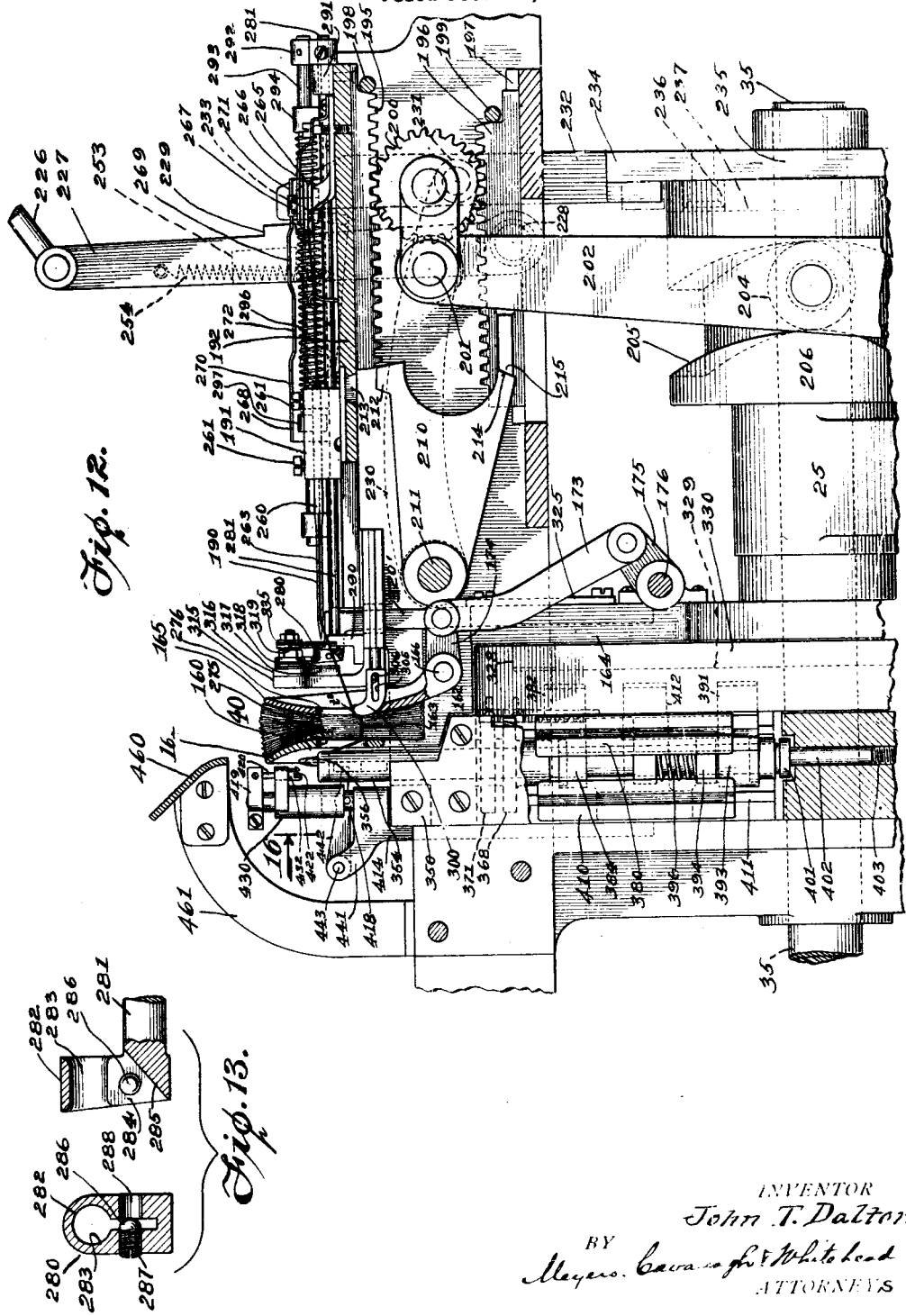

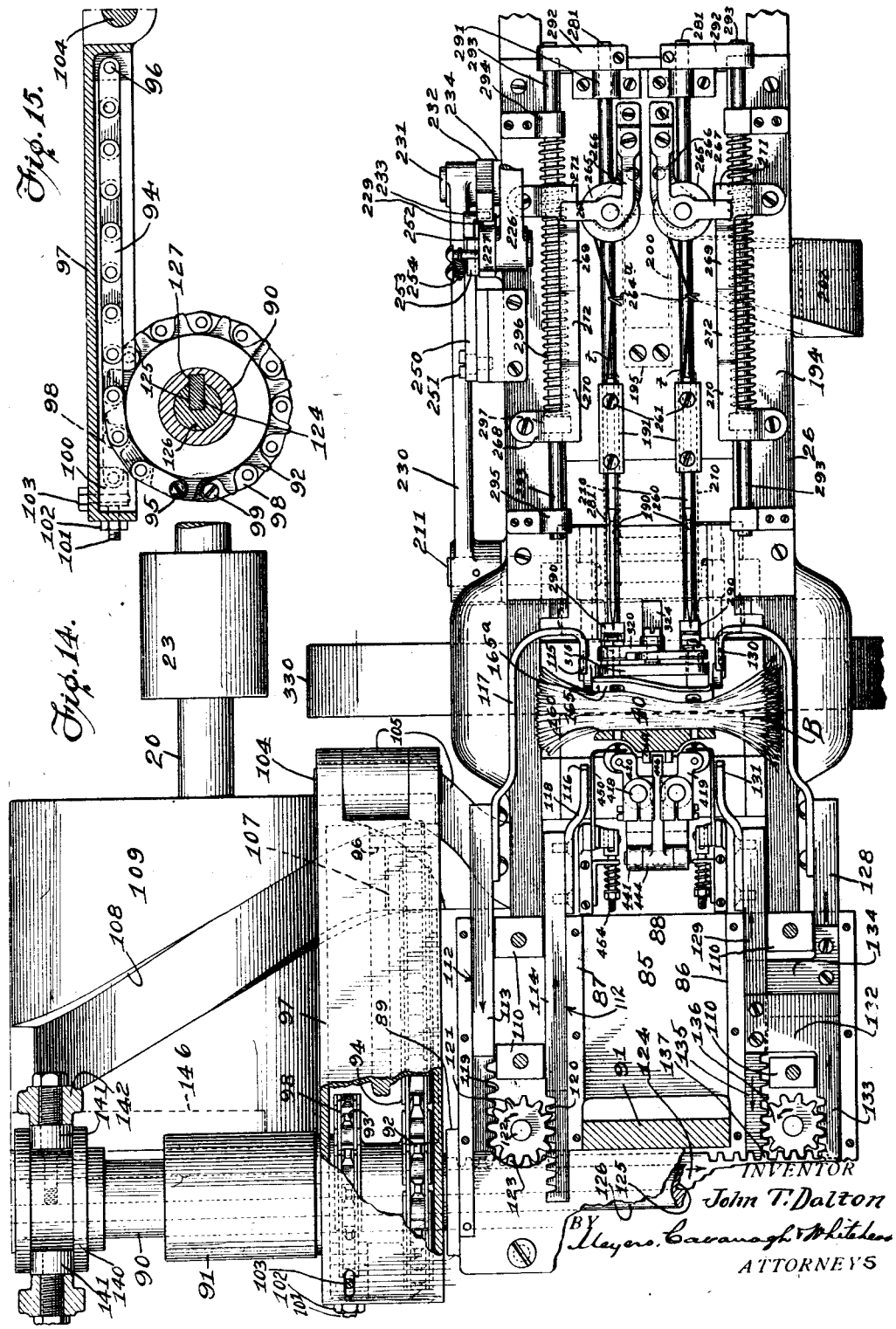

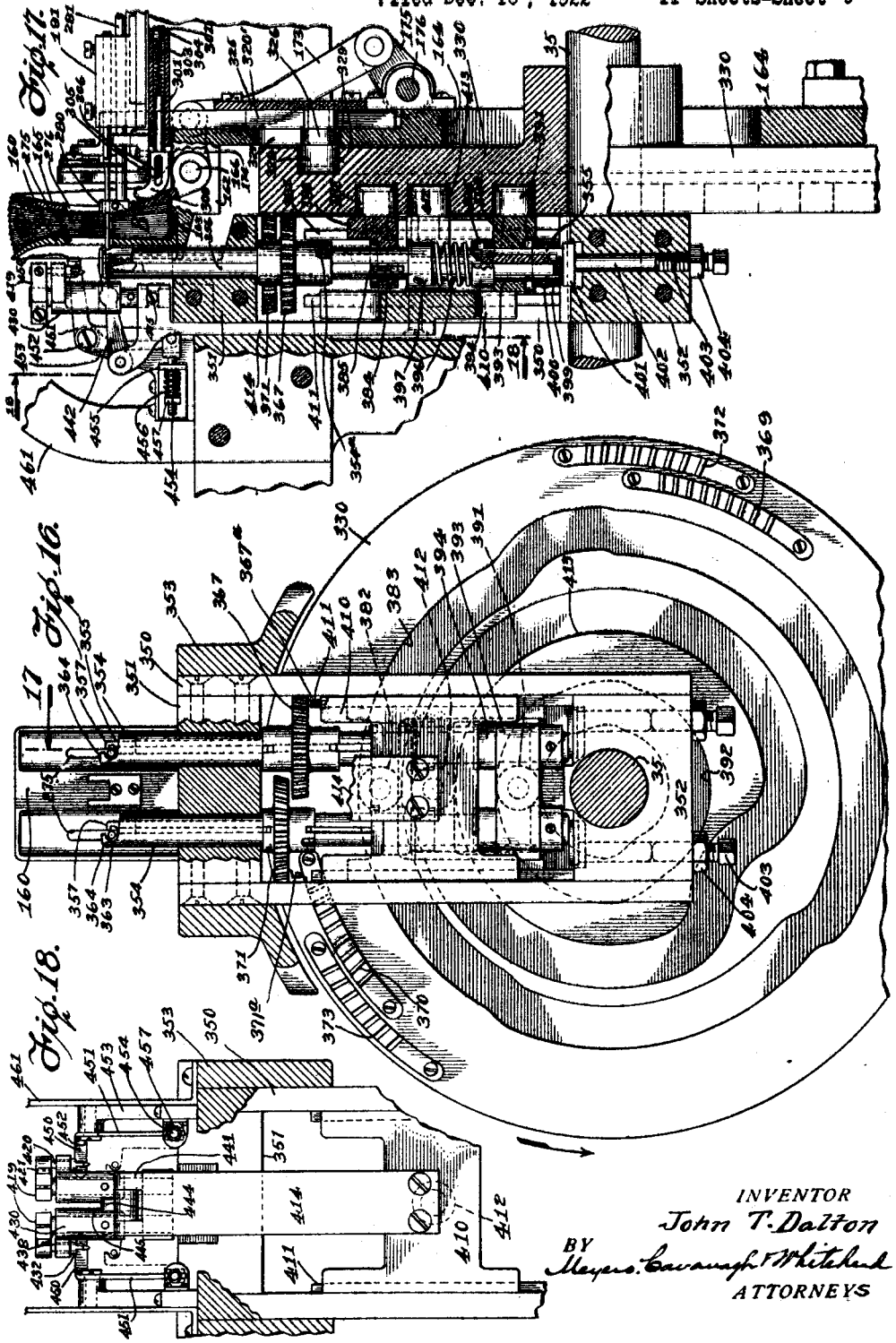

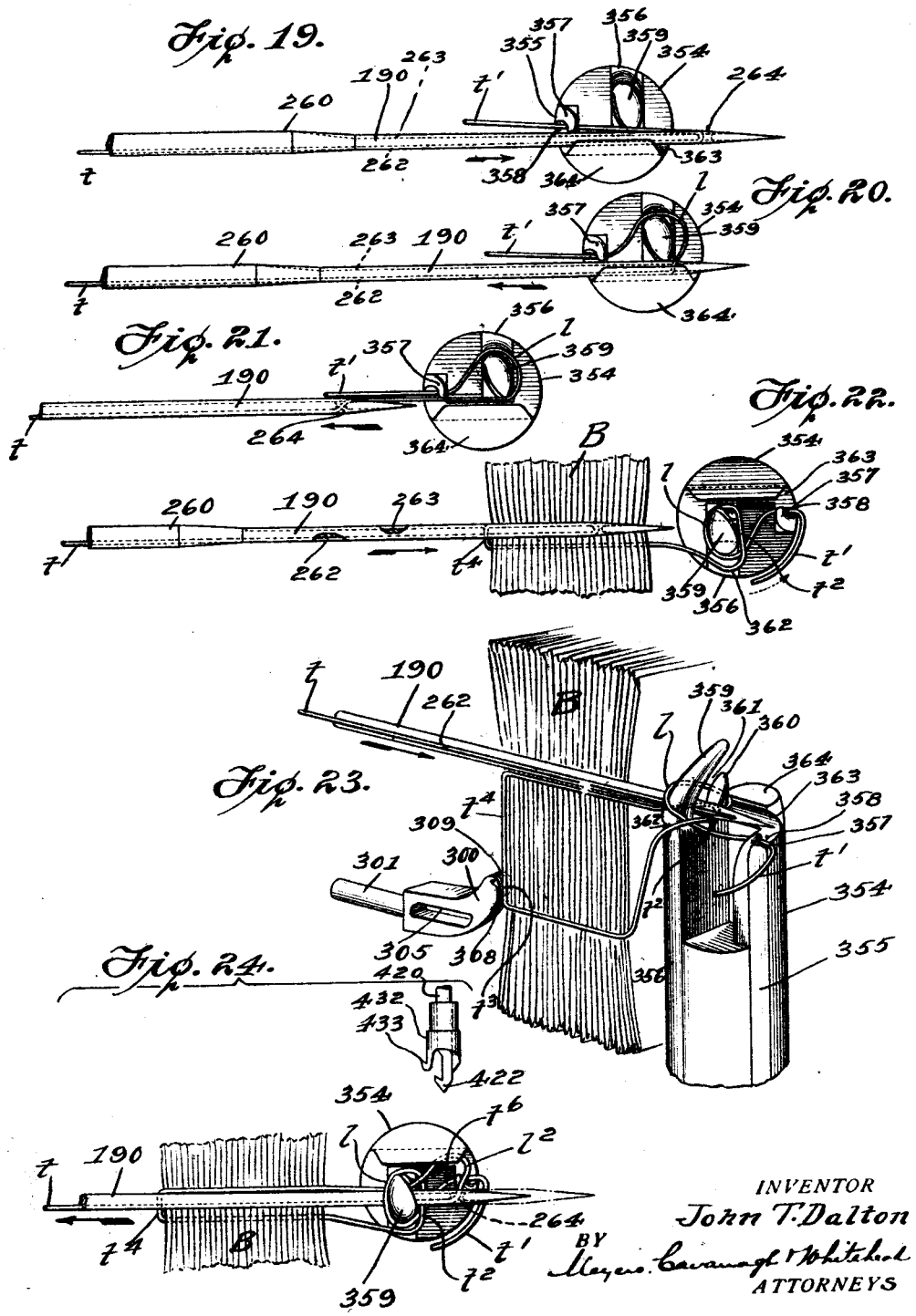

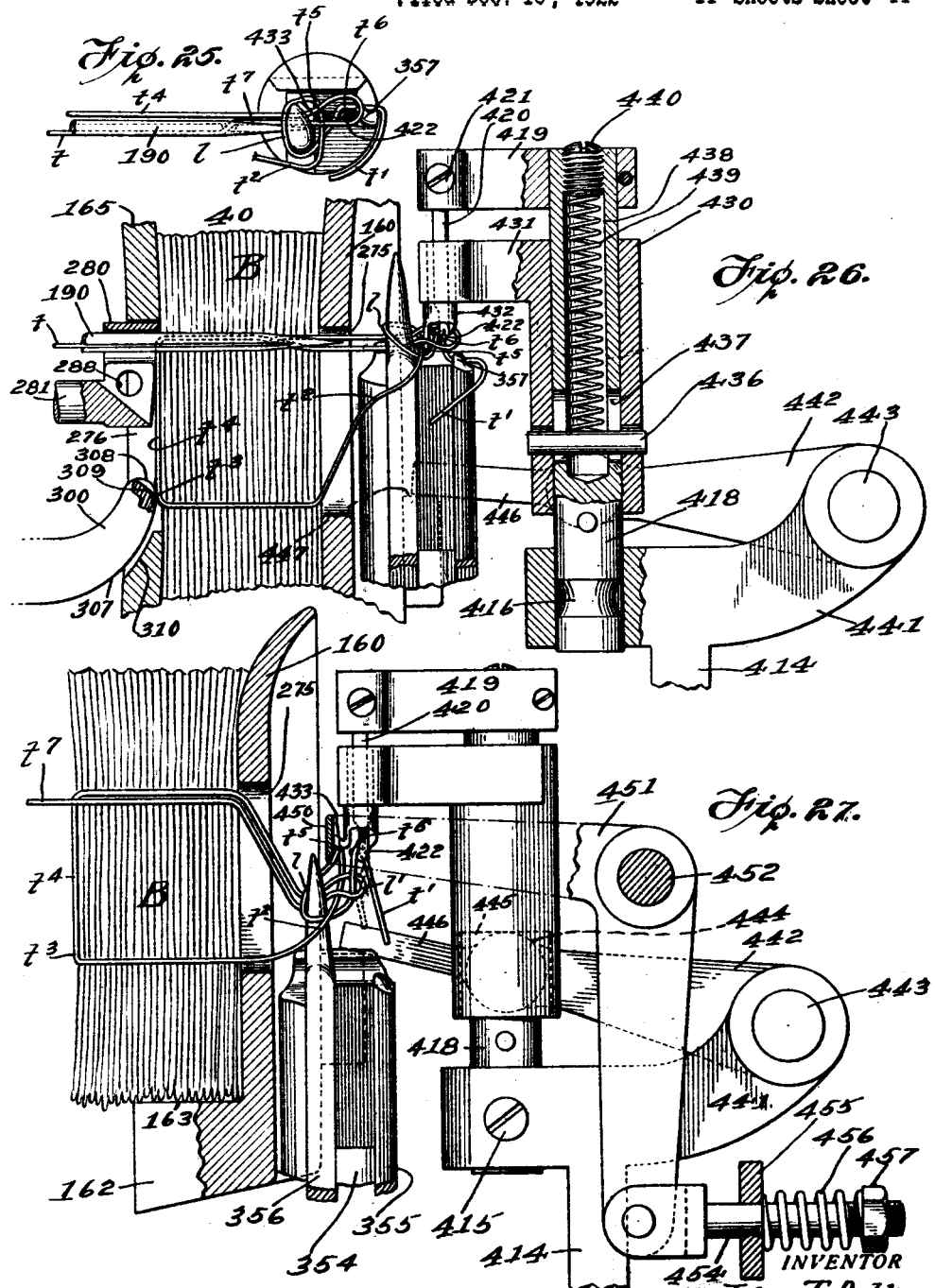

Patented June 16, 1925.

1,542,375

UNITED STATES PATENT OFFICE.

JOHN T. DALTON, OF DURHAM, NORTH CAROLINA, ASSIGNOR TO GOLDEN BELT MANUFACTURING COMPANY, OF DURHAM, NORTH CAROLINA, A CORPORATION OF NEW JERSEY.

ART OF HANDLING AND BUNCHING BAGS.

Application filed December 16, 1922. Serial No. 607,371.

*To all whom it may concern:*

Be it known that I, JOHN T. DALTON, a citizen of the United States, and resident of Durham, in the county of Durham and State of North Carolina, have invented certain new and useful Improvements in the Art of Handling and Bunching Bags, of which the following is a specification.

My invention relates to the art of handling or moving bags in an advantageous way suited to commercial production methods and fastening or securing the bags in bunches. While the invention in its broader aspects is not limited to the handling of a particular kind of bags, it has been especially adapted to the handling and bundling of fabric bags provided with draw strings and used for packaging commodities, such as tobacco. The invention may be readily adapted for handling bags of different sizes, but in one particular instance the fabric bags are made in a standard, rather small size for packaging small quantities of smoking tobacco, and the invention will be described herein in its specific embodiment, as adapted for the handling and bundling of this specific type of bags.

These bags are made of a light or rather loose woven cotton cloth, such as cheese-cloth. After the bags are made wrong side out, with side seams and hemmed edges at the open or mouth end, they are provided with draw strings inserted in the hems and according to the most advanced method of production these draw strings are inserted by automatic machines of my invention disclosed in my prior application, Serial No. 501,358, filed September 17, 1921. In these machines two draw strings are inserted in the hems of each bag, the free ends of each string are knotted, the bags are turned right side out with the bottom corners tucked in to facilitate the proper subsequent filling of the bags, and the bags are delivered into pockets of a rotary delivery wheel with a definite number of bags in each pocket— twenty-five bags in a particular case. It is desirable to preserve the bags in such groups or bunches for ease of handling, packing and shipment, and up to the present time it has been customary to fasten the bags together in such bundles by passing a thread through the bundle and back again and knotting the thread, all by hand operations.

Important objects of the present invention are to provide automatic mechanism for securing the bags in bundles, and to provide means for conveying the groups or bunches of bags in an advantageous way from the stringing machines to the mechanism which inserts the fastening threads, so that a much greater output may be handled very rapidly at very small labor cost.

The handling method and mechanism provided to attain these objects in the present specific embodiment, briefly described, are as follows: The bag stringing machines above referred to are desirably arranged in parallel rows and a long conveyor passes between these rows and is provided at equally spaced intervals with holders, each adapted to receive one of the groups or bunches of bags, and as the delivery pockets of the stringing machines are filled the operators of the respective stringing machines take the bunches from the pockets and place them in the conveyor holders. The bag fastening or bunching machine proper is placed at one end of the conveyor and as the conveyor bag holders approach a suitable discharge point near the fastening machine, transfer mechanism takes the bag bunch from the holder and positions it in a threading or fastening clamp or holder. One or more needles, usually two needles, each carrying a fastening thread, are passed through the bag bunch and withdrawn, the bunch is shifted in relation to the needles and the needles are passed again through the bunch, forming a loop for each fastening thread at one side of the bunch; the threads are then knotted at the other side of the bunch, the needles are again withdrawn and the threads cut, forming two looped and tied fastenings for each bag bunch; the fastened bunch is then removed to a discharge point by a second transfer device.

Where one fastening for each bunch is sufficient one of the needles and cooperating mechanism may be omitted; but for greater security it is usually preferred to use two fastening threads for each bunch.

In the preceding brief outline of the method and mechanism it is not intended to imply any limitations of the broader aspects of the invention, since I believe that I am the first to provide automatic mechanism for fastening bags of this sort and to provide a method of handling and fastening bags suitable for rapid production methods and especially for the employment of automatic machines.

The characteristics and advantages of the invention are further sufficiently described in connection with the following detail description of the accompanying drawings, which show one exemplifying embodiment of the invention. After considering this embodiment persons skilled in the art will perceive that many variations may be made within the principles of the invention, and I do not limit myself to details, except as claimed.

In the drawings:

Fig. 1 is a schematic plan of a suitable shop lay-out in which the fastening machine proper and its conveyor are shown in a desirable arrangement in relation to bag stringing machines indicated diagrammatically.

Fig. 2 is a transverse section through the upper stretch of the conveyor showing one bag holder with a bunch of bags in position therein in transit to the fastening machine.

Fig. 3 is a perspective view of a bunch of bags fastened by the operations of the fastening machine.

Fig. 4 is a side elevation of the fastening machine and one end of the conveyor.

Fig. 5 is an elevation from the opposite side.

Fig. 6 is a top plan with some parts broken away or in section.

Fig. 7 is a vertical transverse section at 7—7, Fig. 6, the cam body 59 being shown in full elevation.

Fig. 8 is a transverse section at 8—8, Fig. 6.

Fig. 9 is a section at 9—9, Fig. 6.

Fig. 10 is a detail transverse section enlarged, showing mainly the thread cutters Fig. 11 is an elevation in the same scale as Fig. 10 of the thread cutters and thread pulling devices.

Fig. 12 is a vertical longitudinal section showing principally the fastening holder or clamp, the needle carrier and operating mechanism and a knotter.

Fig. 13 is a detail of one of the main presser feet.

Fig. 14 is a view mainly in plan but with some parts broken away and in section of the central part of the machine, on an enlarged scale.

Fig. 15 is a longitudinal sectional detail of driving mechanism for one of the transfer devices.

Fig. 16 is a vertical transverse section at 16, Fig. 12, showing mainly the knotters and their operating mechanism.

Fig. 17 is a section in a longitudinal plan of the machine at 17, Fig. 16.

Fig. 18 is a section in a transverse plane of the machine, substantially in the plane 18—18, Fig. 17.

Fig. 19 is an enlarged detail in plan showing the needle, thread and knotter in one relative position.

Fig. 20 is a similar view showing a subsequent position in the knotting operation.

Figs. 21 and 22 show other subsequent positions.

Fig. 23 is a perspective view with a bag bunch shown in section illustrating another subsequent step in the fastening and knotting operations.

Fig. 24 is a view from the same view point as Figs. 19 to 22 and showing a subsequent stage of the knotting operation with certain parts of the thread manipulating mechanism shown out of the true plane to facilitate explanation of the mechanism and its operation.

Fig. 25 is a similar view of another stage of the knotting operation.

Fig. 26 is a vertical longitudinal section of the bag bunch in its fastening holder and knotting mechanism at a stage of operation subsequent to the previous views.

Fig. 27 is a similar view showing the knot nearly completed.

Fig 1 illustrates schematically one desirable factory lay-out in which a fastening machine F is located at the delivery end of a conveyor C, which runs past a series of bag stringing machines S; and desirably the stringing machines are arranged in parallel rows so that the conveyor runs between the rows. A break in the conveyor at $c$ indicates that the conveyor may be of any desired length and actually in a particular installation it is arranged to serve a large number of stringing machines. Each of the stringing machines has a bag receiving wheel W provided with a series of pockets $p$, and in the automatic operations of the stringing machine a stated number of the bags B is deposited in each pocket—twenty-five bags in a particular arrangement of the machine—and then the wheel is rotated, carrying away the filled pocket and positioning another pocket to be filled, and so on. Each bag B has two draw strings $s$ and the tied ends $s'$ of these strings project at opposite sides of the hemmed ends of the bag. Fig. 3 shows a bunch of the bags B after the fastening operation has been performed, but the bunch of bags as it lies in a pocket $p$ of one of the wheels W is in the same condition as shown in Fig. 2, except that the fastening threads *t* are absent. The attendant of each stringing machine removes the bunches of bags B from the pockets as they are filled and inspects them, and it is desired to preserve the bunches in the condition in which they are when removed from the pockets so that the definite count of bags in each group may be preserved, and also that the orderly arrangement of the bags in a neat pile with the mouths or open end of the bags all arranged in one way and substantially in line, and with the draw strings all arranged in an approximately orderly manner, may be maintained, and the necessity for subsequent rearrangement and additional handling avoided, up to the time that the bunches of bags are secured by the insertion of fastening threads in the operations of the fastening machine F.

For this purpose the conveyor C is provided at regularly spaced intervals with bag holders H, described in detail hereafter, and as the conveyor passes the various stringing machines the operators at each machine place the completed bundles of strung bags in the first available vacant holders H, so that when the stringing machines are operated at a certain predetermined rate and the fastening machine and its conveyor are operated and moving at a properly proportioned rate, when the holders reach the discharge position, near the right-hand end of the conveyor in Fig. 1, most of the holders are filled with bunches of bags ready to be transferred to the fastening machine and fastened and then discharged. Owing to the variations in the output in the individual stringing machines and for other reasons, and particularly because in a properly calculated installation, the capacity of the conveyor C due to its actual length and number of holders H or to the speed of travel, or both, is somewhat in excess of the average output of the stringing machines, there will usually be at intervals one or more empty holders H on the conveyor at the discharge point, and to provide for unnecessary or inconvenient operations of the fastening machine F in the absence of bags to be fastened, provision is made as explained hereafter for omitting certain of the fastening machine operations in the absence of a bunch of bags, without, in the preferred embodiment of the invention, stopping the machine entirely.

The conveyor C proper consists of side links 1 connected by cross shafts 2 provided with rollers 3. These rollers run on track 4 to support the upper active stretch of the conveyor, and similar tracks for the lower stretch may also be provided, the forward end of such lower tracks being shown at 5, Fig. 4. At the forward or discharge end the rollers 3 engage sockets 6 in spaced sprockets 7 on a shaft 8, and at the other end the rollers engage in a similar way sprockets 9 on a shaft 10. Shaft 8 is supported in bearings on standards 11 secured to a base 12 which in this instance is the base of the fastening machine proper, and shaft 10 is supported by similar standards or uprights 11'. The rails 4 and 5 are supported by any suitable frame work intermediate the conveyor ends and the conveyor may, of course, be lengthened or shortened to suit the number of stringing machines to be served by it or for other reasons by removing or inserting a suitable number of links 1 and lengthening the frame work or shortening the frame work and relocating the supports of shaft 10 accordingly.

At suitable intervals the conveyor is provided with the bag holders H, these being carried in the present instance by alternate conveyor links 1. In the present specific embodiment each holder consists of two sets of blades or fingers *h*, each set of two pairs of spaced blades consisting of two pairs of spaced blades supported by a base 13, the two bases of the sets of blades of each holder being screwed to a clip 14, which is in turn secured to two opposite conveyor links 1. Resting on portions of the bases 13 between the pairs of blades *h* is a bag base consisting of a strip 15, somewhat bent or curved to provide a portion 16 higher than the other portion and so to conform to the general outline of the lower side of a pack of bags positioned as shown in Fig. 2, the upward inclination of the bag sides toward one end being due to the tucked-in corners previously referred to. The fingers *h* at opposite sides of the bag pack are spaced apart such a distance that the bags are held with sufficient firmness after insertion, by their own elasticity and it is unnecessary to provide yielding clips or blades for this purpose.

The fingers *h* are most desirably slightly curved in vertical, longitudinal planes of the conveyor, as best shown in side elevation, Figs. 4 and 5, the arc of curvature being struck from a center which is the center of movement of an oscillating transfer device later described, this curvature of the fingers being to facilitate the removal of the bag pack by the transfer device.

While in some cases it might be desirable to move the bag conveyor intermittently to cooperate with a fastening machine designed to cooperate with such intermittent conveyor motion, it is more desirable in order to speed up the operation of the fastening machine, and more especially to avoid mechanical difficulty in stopping and starting at frequent intervals a very long and heavy conveyor such as is usually employed in working the fastening machine up to its full capacity, to move the conveyor continuously and to adapt the fastening machine proper and especially its bag transferring devices to cooperate with the continuously moving conveyor. For this purpose the conveyor in the present embodiment of the invention is driven continuously by means of a bevel gear 18 on shaft 8, engaged by a bevel pinion 19 on a shaft 20, which is a part of the fastening machine.

The fastening machine F is built upon the base 12 previously mentioned. The framing includes uprights 21, 22, 23, 24 and 25, in addition to the standards 11, previously mentioned, and longitudinal upper members 26 resting on or secured to various of the uprights. The initial driving shaft 27 represents any suitable initial driving member by which the machine may be driven in any convenient way. In the present instance the driving shaft is provided with fast and loose pulleys 28 and 29 and a belt 30 is connected to any convenient line shaft or counter shaft. The driving shaft 27 rests in bearings in upright 21 and a standard 31, and at its forward end has a hand wheel 32 by which the machine may be turned over slowly by hand. At the rear or delivery end of the machine at the left in Fig. 4, or at the right in Fig. 5, the driving shaft is connected by sprockets and a chain 34 to shaft 20, previously mentioned, which carries the bevel pinion 19 for continuously driving the bag conveyor. This shaft 20 carries various cam bodies referred to later. An intermediate longitudinal shaft 35 is driven from shaft 20 by gears 36 and 37. This intermediate shaft carries various cam bodies referred to later.

At an intermediate, approximately central point of the machine, above the upper frame members 26, is a bag clamp or fastening holder designated generally by the numeral 40, in which bunches of bags are successively placed for the fastening operations. Bunches of bags are transferred from the conveyor holders H to the fastening holder 40 by a transfer device designated generally as 41. This consists substantially of a housing or body 42 having a hub 43 mounted on a shaft 72 arranged to oscillate in bearings 45 which are carried by upright lever arms 46 and 47. These lever arms are connected by a web 47ª and are arranged for oscillation on a shaft 48 mounted in suitable bearings on the base, and one of the arms, 47, has a cam roller 49 engaging a cam groove 50 formed in the periphery of a cylindrical cam body 51 secured on shaft 20. This cam oscillates the arms 46 and 47 to shift the center of oscillation of the transfer device in conformity with the conveyor movement. To oscillate the transfer device a link 52 is provided with chains passing about sprockets on shaft 72, the details of this chain and sprocket mechanism being similar to the mechanism for oscillating the second transfer device, later described. The link 52 is pivotally connected at 53 to the upper end of a lever 54 fulcrumed at 55 near the base plate, and this lever has a cam roller 56 mounted on a stud 57. The roller engages a cam channel 58 in a cam body 59 fixed on shaft 20. To grip and transfer the bags, the transfer device is provided with a pair of opposed grippers 60, 61, and another pair 62, 63, these being carried by slides or arms 64, 65, 66 and 67, moving in and extending from the housings 42. The slides are moved to open and close the grippers by suitable mechanism such as is later described in connection with the second transfer device. This mechanism is operated in the first transfer device by a bar 70 engaging a channel 71 in shaft 72. A shifting collar 73 is arranged to slide on the shaft and to engage with the bar 70, and is provided with an annular channel engaged by rollers 74 of a circular shifting yoke 75 formed in the upper end of a lever 76, the lower end of which is formed with a hub mounted to oscillate on a trunnion pin 77 which extends at a right angle from a sleeve 78 mounted to oscillate on a shaft 79 carried by lugs 80 on the base plate. Rigidly secured to the sleeve 78 is an upwardly extending arm 81 provided with a cam roller 82 engaging a cam groove 83 in cam body 51, previously mentioned. The pivotal mounting of lever 76 on the pin 77 permits it to follow the shifting of the fulcrum center of the transfer mechanism 41, that is the movement of the axis of the sleeve 44 as that axis is shifted by the oscillation of levers 46 and 47; and the oscillation of sleeve 78 on the shaft 79, caused by the rotation of cam body 51 and cam groove 83 acting on arm 81, causes the lever 76 to oscillate laterally and so to move bar 70 longitudinally and operate the grippers.

The grippers are separated or "open" as the link 52 is moved forward (to the left in Fig. 5) to oscillate the transfer mechanism about the axis of sleeve 44 and at the same time the lever arms 46 and 47 are moved forward, that is toward the conveyor or to the left in Fig. 5, or toward the right in Fig 4, until the transfer mechanism is in the position of Figs. 5 and 6. The grippers are then closed by lateral oscillation of lever 76 and substantially simultaneously the axis of sleeve 44 is moved to the rear, that is to the right in Fig. 5 or 6, by movement of lever arms 46 and 47, so that the grippers move forward along with the continuously moving conveyor while they are in operative relation to the conveyor and its bag holding arms, Fig. 12. Fig. 6 shows that the gripper blades are arranged to pass between the pairs of fingers and to grip the bags where they are very definitely located and held between the fingers of each pair. Substantially as soon as the bunch of bags is gripped by the grippers 60, 61, 62 and 63, as shown in Fig. 6, the transfer unit is oscillated upward from the position of Figs. 5 and 6 while it is moving rearward, that is to the right in those figures, by the movement of arms 46 and 47, lever 54, link 52 and the chain mechanism, the transfer unit thus sweeping through an arc of oscillation with a shifting center, passing through the position shown in Fig. 4, and finally the bag bunch is deposited in the fastening holder 40; the grippers are opened, the transfer unit rises and shifts forward again to take another bunch of bags from the conveyor, and so on.

After fastening, the bunch of bags is moved from the fastening holder 40 by a second transfer mechanism 85. This is in general similar to the first transfer mechanism and performs similar functions, except that it is not necessary to shift the axis of oscillation of the transfer unit, since it does not cooperate with a moving conveyor. The transfer mechanism comprises two housings 86 and 87 connected by a central member or web 88, and also connected to a hub 89 which is mounted on a shaft 90, and the shaft is arranged to oscillate in fixed bearings 91. Fixed on the shaft 90 are two sprockets 92 and 93. A chain 94 is connected to sprocket 92 at 95 and the other end of the chain is connected at 96 to a link 97, the lower face of which is hollowed out to accommodate the chains and sprockets. Another chain 98 is connected to the other sprocket 93 at 99 and passes about its sprocket in the opposite direction from the arrangement of chain 94 and is connected at its other end to the link, the connection being made desirably by means of a slidable block 100, adjusted by a screw 101 and nut 102 and further secured when necessary by a screw 103, this adjustment being to take up slack in the chain mechanism. The link is pivotally connected at 104 to the upper end of the lever 105 which is fulcrumed at 106 on the base plate and has a cam roller 107 engaging a cam groove 108 in a cam body 109 on shaft 20. When the lever 105 is oscillated by its cam mechanism the link 97 is moved to and fro and when it moves one way one of the chains rotates shaft 90 to oscillate the transfer mechanism by a pull on one of the chains. For instance, when the shaft moves to the right in Fig. 15, chain 94 pulls on its sprocket 92 and rotates shaft 90 clockwise to oscillate the transfer mechanism to the right in Fig. 4 and when the link is moved the other way the other chain 98 pulls on its sprocket 93, and the shaft and transfer mechanism are oscillated in the other direction.

The transfer mechanism is provided with bag gripping mechanism as follows: Guideways are formed in the housing 87 between central blocks 110 and the side walls 112, and in these guide-ways are mounted for reciprocating movement gripper bars 113 and 114 which carry a pair of grippers 115 and 116 consisting of serrated faces formed on suitable curved blades 117 and 118. On inward portions of the gripper bars are formed toothed racks 119 and 120 arranged to engage respectively lower and upper portions of the teeth of a pinion 121 mounted on a stud 122 in the housing. Central portions of the pinion teeth are engaged by a rack 123 formed on a rack bar 124 similar to the bar 70 of the first transfer unit. This bar 124 is arranged to move in a channel 125 formed in shaft 90. In the other housing 86 guide-ways are similarly formed between the central blocks 110 and the housing walls, and in these channels are arranged gripper bars 128 and 129 carrying grippers 130 and 131 similar to the grippers 115 and 116, previously mentioned. The gripper bar 129 is secured by a cross connection 132 to a rack bar 133 and the bar 128 is secured by a cross connection 134 to rack bar 135, and these rack bars are provided with teeth engaging upper and lower portions of the teeth of pinion 136, similar to pinion 121, and the central portions of the teeth of pinion 131 are engaged by a rack 137 formed on the rack bar 124. When the rack bar is moved longitudinally the pinions 121 and 136 are rotated, and by reason of the straight connection between rack bars 113 and 114, and their toothed portions 119 and 120, respectively, and the cross connections between rack bars 128 and 129 and their rack members 135 and 133 respectively, both of the grippers 116 and 131 are moved simultaneously in one direction, while the grippers 115 and 130 are moved simultaneously in the opposite direction to grip or release the bag bunch. The bags are arranged in the fastening holder 40 so that considerable end portions of the bags protrude at each side of the holder and the grippers are arranged to move close to the sides of the holder to firmly grip the bags after fastening.

The rack bar 124 is moved substantially as in the case of the first transfer device, by a shifting collar 140 sliding on shaft 90 and connected to the rack bar, and the collar is moved by rollers 141 carried by a circular yoke 142 formed in the upper end of a lever 143 fulcrumed at 144 for lateral oscillation and provided with a cam roller 145 engaging a cam groove 146 in cam body 109, previously mentioned.

After the fastening operation, when the fastening holder 40 is in upward position, the second transfer device 85 is moved to forward horizontal position, Figs. 5 and 6, with the clamping members separated; they are then brought together by movement of the rack bar 124 to grip the fastened bunch of bags as the latter is released from the fastening holder 40; the transfer device is then oscillated in the direction of the arrow, Fig. 4, and as it approaches rearward horizontal position indicated by dotted lines in Fig. 5 the grippers are separated to release the bunch and it falls into box or hopper 150.

To aid in receiving the bag bunches from the second transfer device or to release them from the latter, it is desirable in some cases to provide receiving devices such as the following: Before the grippers are opened to release the bunch, the bunch of bags is brought between serrated, somewhat curved edge surfaces 151 of plates 152 carried by a frame-work 153 supported by the discharge box 150, and the serrated edge 154 of a spring blade 155 carried by a strut 156 secured to the frame of the machine at 157. This spring blade is formed with an annular or beveled surface 158 to assist in guiding a bag bunch between the serrated members 151 and 154. When the bag bunch is released by the opening of the transfer grippers the bunch is held in the position shown in Fig. 4, and the movement of the next bunch into the receiving grippers causes the bunch previously located there to be discharged into the box.

The fastening holder 40 comprises a rear plate 160 formed with an accurately curved upper portion 161, and connected to a horizontal member 162, an upper surface of which at 163 forms a base to support the bag bunch. The member 162 is connected to a vertical upright slide 164, suitably guided for vertical movement. Confronting the rear plate 160 is a movable front plate 165 having a generally curved contour in vertical section and pivoted at 166 on the horizontal member 162. The slide 164 is provided with an aperture 167 surrounding shaft 35 and is moved vertically to position the holder 40 in upper and lower positions for the fastening operations by a bell crank lever 168 fulcrumed at 169 and provided with a cam roller 170 engaging a cam groove 171 and cam body 172 on shaft 35. The movable clamping plate 165 is moved to clamp and release the bags by a link 173 connected at one end to an arm 174 which extends from the pivot axis of the plate, and at the other end to an arm 175 on a shaft 176 mounted in bearings in the slide 164; and this shaft 176 has an arm 177 connected by a yieldable link 178 to the upper end of a lever 179 fulcrumed at 180 and provided with a cam roller 181 engaging a cam slot 182 in cam body 172. The yieldable link 178 is formed in two parts with an interposed spring 184.

The described linkage is such that when the plate 165 is moved to clamp the bags as shown in Fig. 12, it is maintained in clamping position while the holder 40 is lowered and then raised again in the fastening operation. The holder 40 is held in upper position by bell crank lever 168 with the clamping plate 165 retracted to receive a bunch of bags from the first transfer device 41. When the bunch is positioned plate 165 is moved to clamp it about the time the bunch is released by the separation of the transfer grippers; certain fastening operations are performed; the holder is moved down to lower position by bell crank 168; other fastening operations are performed; the holder is raised; the second transfer grippers of transfer mechanism 85 are brought into relation to the bag bunch; and about the time the last named grippers are closed to grip the bunch, plate 165 is retracted to release the bunch; the second transfer mechanism moves away carrying the fastened bunch with it, and the operations are repeated indefinitely.

In the present embodiment of the invention the bag bunches are to be fastened by two separate fastening threads, and for this purpose two needles 190 are removably secured in holders 191 on a reciprocating needle carriage 192, which is arranged to move in guide-ways 193 on the central frame of the machine and secured by gibs 194. A toothed rack 195 is secured to the under surface of the carriage and directly below this a toothed rack bar 196 is arranged to move in longitudinal guides 197 on the lower frame member. The forward movement of the carriage and of the rack bar 196 may be limited by stops 198 and 199. A pinion 200 engages both of the racks and is carried by a stud shaft 201 secured in the upper end of a lever 202 fulcrumed at 203 and provided with a cam roller 204 engaging a cam groove 205 on a cam body 206 on shaft 35. Whenever the rack slide 196 is held stationary and lever 202 is moved to the left in Fig. 12, the pinion 200 is rotated by engagement with the lower rack, and the upper rack 195 is driven forward to impel the needle carriage and move the needles through the bag bunch. Since the particular style of fastening employed in the present embodiment of the invention requires two needle strokes for the completion of the fastening, the cam groove 205 is contoured to move the needle carriage forward and back twice in each cycle of the machine. The fastening holder 40 is maintained in upward position during the first carriage advance and retreat, and the holder is then moved down and so held during the second carriage advance and retreat and then moved up again to complete the cycle. The described arrangement of carriage driving mechanism has in view particularly a convenient way of omitting carriage movement in the absence of a bunch of bags; and if it is not considered necessary to provide for stoppage of the carriage in such cases the driving mechanism may be correspondingly simplified.

In the present embodiment where it is desired to avoid moving the carriage when there is no bunch of bags present in the fastening holder 40, in order to avoid the supply of fastening threads in the neighborhood of the holder and knotting mechanism, and for other reasons, stop mechanism to control the carriage movement is provided as follows: A pair of stop arms 210 is arranged on a rock shaft 211 with one arm at each side of the racks 195 and 196, or in some cases a single stop arm would be sufficient, arranged at one side of the racks. Each stop arm has an upper stop member 212 arranged to enter a socket 213 in the carriage and a lower stop member 214 arranged to cooperate with an abutment 215 on rack slide 196. Normally the stop arms are in the position shown in Fig. 12 with stop members 214 engaged with the lugs 215 to lock the lower rack, and in this case the carriage is moved forward at every left-hand movement of lever 202. To stop the carriage the rock shaft 211 is rotated to move the stop arms upward and the stop members 212 then enter the carriage sockets 213, and the carriage is locked and the left-hand movement of lever 202 then merely advances the rack slide 196 and retracts it again at the return movement of the lever. The positioning of the stop arms is controlled automatically by the presence or absence of a bunch of bags in a certain position in the following manner in the present embodiment of the invention:

An upright frame member 220 supports a curved, cam-like feeler or bag operated lever 221 pivotally mounted at 222. The lever is arranged to lie in the path of the central portion of a bunch of bags held by the grippers of the first transfer mechanism 41, so that as the bunch of bags is moved upward in its arcuate path from one of the holders H on the conveyor, the central portion of the bag bunch between the grippers encounters the forward part of the curved lever portion and raises the lever to the position shown in Fig. 4, and thereafter the lever is held up for a certain length of time by the bunch of bags as it moves onward toward the fastening holder 40. The feeler lever is connected by an arm 225 and a link 226 to a detent lever 227 pivoted at 228 at one side of the central frame structure. This lever has on one edge a lug forming a shoulder 229. At the same side of the frame an arm 230 is fixed to the shaft 211 which carries the stop arms 210, and arm 230 is pivotally connected at 231 to a vertically movable bar 232, which has near its upper end a horizontal latch face 233 to cooperate with shoulder 229. The bar 232 has a horizontally offset portion 234, Fig. 7, and a lower part 235 of this portion is bifurcated to a straddle shaft 35. Above the shaft the offset portion has a cam roller 236 arranged to follow a cam track 237 formed on the forward face of cam body 206, previously mentioned, or in other cases to follow the circular periphery of the cam. The cam track 237 is defined by an inner member consisting of a circular portion 238 and a lobe 239, and a peripheral rim 240, having openings at 241 and 242 adjacent to the crest of lobe 239 and wide enough to permit passage of the cam roller. In every cycle of the machine, if the roller 236 is following the cam track 237, the lobe 239 raises the roller so that its lower surface is flush with the periphery of the cam. This movement of the roller moves the bar 232 up far enough so that its latch face 233 is slightly above the level of shoulder 229 of detent lever 227, and the same movement of the bar 232 raises lever 230 and in this way raises the stop arms 210 and brings the stop members momentarily in engagement with needle carriage sockets 213. At this time the initial transfer mechanism 41 has commenced its travel away from the conveyor, and if a bag pack was present in the conveyor holder and so grasped between the transfer grippers, the central portion of the bag bunch elevates the feeler lever 221, and through the link 226 the detent lever 227 is retracted, that is moved to the left in Fig. 4, or Fig. 12, and engagement of the detent shoulder with latch face 233 of bar 232 is prevented and almost immediately the bar descends again as the cam roller runs down the other face of cam lobe 239 and thereafter follows the circular cam track 237. Immediately upon the descent of bar 232 arm 230 and the stop arms 210 move downward again and release the needle carriage and at the same time the stop faces 214 engage the shoulders 215 and back slide 196 and lock the rack, and in the ensuing advance movement of lever 202 the needle carriage is moved forward and it is then moved back again and then forward and back once more, any shifting of the stop arms 210 which would interfere with the performance of the two advance and return movements of the carriage in its complete cycle of movements being prevented until the machine cycle is completed, by the retention of the cam roller 236 in the cam track 237. At the completion of the cycle and the beginning of the next cycle the cam roller is again elevated by the lobe 239. Supposing in this case a bunch of bags is absent from the next conveyor bag holder H, when the transfer mechanism 41 moves in the direction of the arrow, Fig. 4, there is no bunch of bags held between its grippers and there is nothing to elevate the feeler lever 221. The lever, therefore, remains in lower position and link 226 moves the detent lever 227 to the right, Figs. 4 and 12, so that its shoulder 229 comes under latch face 233 of bar 232. The bar is, therefore, held up long enough for the cam body 206 to rotate to such a point that the cam roller 236 is over the continuous peripheral flange 240 and bar 232 is then retained in elevated position by this cam flange during the completion of the machine cycle without possibility of shifting during that time, whether detent lever 227 is moved so as to retract its shoulder 229 from the latch face 233 of bar 233 of bar 232 or not. The bar 232 being held up during the first part of the cycle and thereafter, the arm 230 and the stop arms 210 are correspondingly held up and stop members 212 are retained in engagement with the carriage sockets 213 and the carriage is locked and at the same time the rack slide 196 is free to move by the retraction of the stop members 214, and the carriage driving lever 202, therefore, makes two idle or ineffectual to and fro movements during the described cycle.

It is sometimes desirable to provide conveniently operated means for causing the carriage to move in spite of the absence of bags, for instance, when testing or adjusting the machine. For this purpose a secondary detent lever 250 may be pivoted at a stationary point 251, and this is provided with a latch 252 to engage a lug 253 on one side of lever 227. Lever 250 is urged upward by a spring 254 connected to an upper part of lever 227. A free end of lever 250 beyond the latch 252 is arranged in the path of latch face 233 of bar 232. Whenever, in the absence of a bunch of bags in the grippers of transfer mechanism 41, the feeler level 221 is raised by hand, detent lever 227 is retracted and latch 252 engages its lug 253 and the detent lever is thus held in retracted position so that bar 232 is permitted to descend as its cam roller 236 follows track 237 of cam 206, so that in this case the carriage will make its forward advance and return movements during the indicated cycle of the machine. As bar 232 descends its latch face 233 strikes the end of the secondary detent lever 250 and retracts its latch 252 from lug 253, releasing the main detent lever and permitting it to move to active position and at the same time permitting the feeler lever 221 to drop to normal position. In this way when the carriage is compelled to move in the normal manner in the absence of a bunch of bags, it will only so move during one cycle of the machine, and to cause the carriage to move in the next or any other cycle in the absence of bags, the detent mechanism must again be arbitrarily actuated by hand.

The needles 190 have enlarged butt-ends 260 passing through holes in the holders 191 and removably secured by set screws 261. Each needle has a channel 262 along one side from the eye to the end of the butt to receive the thread $t$, and at the opposite side the needle shank has a channel 263 extending from the eye 264 to the beginning of the butt, this channel being arranged to receive the free end of the thread in some cases. The two channels are arranged in a horizontal plane. From the ends of the needle butts the threads $t$ pass through guide eyes 264ª and through or around any suitable tensioning devices 265. The threads go to the tension devices from any suitable source of supply, such as spools, which may be placed in tubs at one side of the machine. The tension of the threads may be varied in different needle positions by providing the tension springs 266 with projections 267 which run over cam plates 268 secured to stationary frame members. These cam plates have elevated portions 269 and 270 and depressed portions 271 and 272, so that when the carriage is in its rearward position remote from the bags in fastening position, the full tension for which springs 266 are adjusted, is applied to the threads by the projections 267 lying over the cam portions 271; early in the advance movement of the carriage tension is relieved as the projections pass over cam portions 269; full tension is again applied as the projections pass over cam portions 272 and tension is again relieved with the needles in their most advanced position as the projections pass over or rest on cam portions 270.

Plate 160 of the fastening holder 40 is provided with parallel vertical openings 275 and the movable clamping plate 165 is provided with parallel vertical openings 276 in line with the openings 275, these openings or slots being arranged to receive the needles and accommodate the threads, and openings 276 being also arranged to accommodate bag pressing devices or presser feet, as later explained.

Main or primary presser feet 280, one corresponding to each needle, are carried by the carriage. Each of these presser feet, Fig. 13, is formed on the forward end of a rod 281 and consists substantially of a circular portion 282 forming a needle hole 283 of ample size, with a narrow downward extension in the form of a slot 284, the lower face 285 of which is arranged at a downward angle to conform to one position of the thread. Above this lower wall 285 the slot 284 is partly obstructed by the rounded end 286 of a screw 287 inserted in one wall of the presser head. The rounded end confronts a hole 288 in the other wall and the position of the screw end may be adjusted by turning the screw, the rounded screw end cooperating with the wall of the slot and with the hole 288 provides a thread guiding and controlling device or stop which may be adjusted by turning the screw, the function of this device being explained hereafter. The rods 281 are arranged to reciprocate in guides 290 and 291 on the carriage and these rods are connected by cross pieces 292 to spring rods 293 arranged to reciprocate in guides 294 and 295. Springs 296 located about rods 293 between guide eyes 294 and collars 297 on the rods urge the presser feet forward or to the left in relation to the needle carriage until that movement is limited by the cross pieces 292 striking guides 291 when the carriage is retracted; and when the carriage moves forward the presser feet enter slots 276 of plate 165 and press against the bag bunch and compress it at the point of needle entry and during the time that the needle passes through the bags and until it is retracted; and then the return movement of the carriage retracts the presser feet and they again go into the upper ends of the slots 276 during the second needle stroke after the holder 40 is moved downward.

The auxiliary or secondary presser feet 300 are carried by stems 301, Fig. 17, mounted in guide sleeves 302 secured to fixed parts of the machine and the stems are acted on by springs 303 secured within the sleeves by plug screws 304. The presser members are provided with slots 305 accommodating stops 306 to limit forward movement and they have rounded outward surfaces 307 terminating in toes at 308 (Fig. 26), and shallow thread grooves 309 pass across the upper faces of these toes. The rounded portions 307 of the presser members are adapted to enter slots 276 so that the toes 308 may press upon the bags and secure the threads at certain times; and the lower parts of these rounded surfaces 307 cooperate with angular cam surfaces 310, formed at the bottoms of the slots 276, so that the presser members are retracted by upward movement of the holder 40 and are permitted to move forward to active position when the holder is depressed. The function of these secondary presser members is sufficiently described hereafter.

Adjacent to the outer surfaces of plate 165 a bracket 315 (Figs. 10, 11 and 12), supports a fixed cutter body 316 having angular cutter blades 317. Movable cutter blades 318 are pivotally mounted on studs 319 and are provided with arms 320, which may be integral with the blades, connected to the vertically movable actuating rod 320′ by means of a pin 321 and suitable slots in the arms. The pin and the upper end of rod 320′ are guided by a slot 322 in the cutter body 316. The actuating rod 320′ has a horizontally offset portion 324 and the lower portion of the rod is guided for relative vertical movement in the vertically movable plate 164 which carries the fastening holder 40, and is secured therein by a plate 325. The rod 320′ has a stud 326 passing through a slot 327 in plate 164 and provided with a cam roller 328 running in a cam groove 329 in a cam body 330 on shaft 35. The cam groove is contoured so that after the last carriage return movement in the cycle the threads t are cut by an upward movement of rod 320′ which causes the movable cutters 318 to shear the thread against the fixed cutting edges 317.

It is desirable in some cases to act upon the threads at or just after the moment of cutting, largely for the purpose of properly positioning them for the first needle movement. For this purpose thread fingers 335 are provided as parts of bell crank members 336 pivoted on the studs 319 and spaced considerably away from the cutters in the longitudinal direction of the machine. These thread benders or pushers 335 are actuated by slots 337 in the bell crank members and pins 338 passing through the slots and secured to a plate 339 which is fixed on rod 320′ or secured to screw-stud 321, so that as the cutters are actuated the fingers 335 are moved inward against the severed thread ends projecting in advance of the needle eyes, and these ends are moved laterally so that in the first cycle of the machine as the needles enter the bags the threads will be properly bent back against the needle shanks and will not project forward and be crumpled up or otherwise improperly located.

In the broader aspect of the invention any suitable thread gripping and manipulating or knotting mechanism may be employed to secure or knot the thread and so complete the fastening of the bag bunch. As representative of suitable mechanism for this purpose I show in the drawings mechanism which may be conveniently described as knotting mechanism for performing these functions, which is in general similar to the string handling or knotting mechanism disclosed in my above identified application, Serial No. 501,358, filed September 17, 1921, with certain improvements and modifications to adapt it for the present type of machine. This mechanism will now be briefly described:

Close to the rear face of the circular cam body 330, above mentioned, is a knotter frame consisting of vertical side plates 350 connected by an upper cross piece 351 and a lower cross piece 352. This frame is located between main frame members 353, Fig. 16. The main knotter spindles 354 are arranged to reciprocate and rotate in cylindrical bearings in the upper frame member 351. A gripper bar 355 is mounted for longitudinal (vertical) movement in a suitable slot in the spindle and a looper bar 356 is similarly mounted in another slot. At its upper end the gripper bar has a curved gripper finger 357 adapted to clamp the free end of the thread after the first advance movement of the corresponding needle on a flat clamping surface 358 formed near the upper end of the spindle. At its upper end the looper bar is formed with a main or primary looper horn 359 and a secondary horn 360 providing between them a curved aperture 361. A thread channel 362 is formed substantially at the root of the primary horn 359 on an outer surface of the looper bar. At one side of the upper end of the spindle is a straight transverse channel 363 defined in part by the lip 364.

Secured to rotate with one of the spindles 354, but held against vertical movement by a lug 367ª, is a bevel pinion 367, arranged to cooperate with the suitably arranged teeth or gear sectors 369 and 370 secured to the face of cam body 330; and similarly mounted on the other spindle 354 is a similar pinion 371, positioned by a lug 371ª, and arranged to cooperate with gear sectors 372 and 373 on the cam body. A shiftable block 380 is arranged to move on guide ribs 381 on the inner faces of frame members 350. This block has a cam roller 382 engaging cam groove 383 in cam body 330. The block also has a collar portion 384 surrounding the spindle and engaging between prongs 385 formed on the outer surface of the looper bar 356 to move the looper horns vertically in relation to the spindle. Another shifter block 390 is arranged to move on the guide ribs 381 and has a cam roller 391 engaging in a cam groove 392 in cam body 330. The block also has a collar portion 393 surrounding the spindle and located below a collar 394 slidably mounted on the spindle. The collar engages a prong 395 formed on the outer surface of the gripper bar 355. A spring 396 is compressed between collar 394 and another collar 397 fixed on the spindle. A collar 399 is adjustably secured on the spindle by a set screw 400 and this serves as a stop to limit downward movement of the shifter block in relation to the spindle. Downward movement of the spindle is adjustably limited by a stop plate 401 provided with stems 402 engaging the upper ends of set screws 403 passing through the frame cross piece 352 and secured in adjusted position by lock nuts 404.

A shifter block or cross head 410 is arranged to move vertically on guide ribs 411 formed on inner faces of the frame members 350. This cross piece has a member projecting between the two looper spindles and provided with a cam roller 412 engaging a cam groove 413 in cam body 330. A strut 414 is connected to the cross head 410 and near its upper end is connected by set screws 415 entering grooves 416 therein, to rods 418, to the upper ends of which are clamped arms 419. Stems 420 are adjustably secured in the arms by set screws 421 and at the lower ends of these stems are formed knotter hooks 422, one to cooperate with each of the knotter spindles and its associated mechanism.

A sleeve 430 is arranged to slide on each of the rods 418, and each of these sleeves is provided with an arm 431 to which is connected a tubular hook member 432 surrounding one of the stems 420 and provided with a knot lifter hook 433. Each sleeve 430 has a pin 436 passing through a slot 437 in the corresponding rod 418. The rod is bored out to form a tubular upper portion 438, and a spring 439 in this tubular portion is held against the pin by a screw 440 inserted in the end of the tube. The upright strut 414 at its upper end has a slotted extension 441 and a lever 442 is pivoted in this slot on a pin 443. The lever has a rounded portion 444 engaging under shoulders 445 formed on the inner faces of sleeves 430; and beyond the rounded portion the lever has an extention 446 adapted to cooperate with a lug or block 447 secured to bag holder plate 160.

To cooperate properly with the knot lifting hook 433 of each knotter a knot releasing or stripper finger 450 is arranged adjacent to each of the hooks. Each of these fingers is carried by a horizontal arm of a bell crank lever 451 fulcrumed at 452 on a stationary bracket 453. The lower end of the vertical arm of each bell crank is pivotally connected to a stem 454 passing through a stationary lug or bracket 455, and a spring 456 is compressed between this bracket and a nut 457 on the stem to urge the finger 450 downward.

A guide plate 460 mounted on a stationary arm or bracket 461 may be provided to assist in guiding the bag bunches into the fastening holder 40.

The machine may be started and stopped in any convenient way, for instance, by a belt shifter 470 carried by a reciprocating bar 471 mounted in brackets 472 and this bar is provided with a handle, not shown, convenient to the operator.

It has been mentioned that the bag bunch is thicker near one end than the other due to the tucked-in corners of the bag bottoms. To allow for this increased thickness the clamping plates at the fastening station may be properly contoured. For example, the movable plate 165 is curved as viewed in plan, Fig. 14, to provide a portion 165ª, which is spaced away from the plate 160 farther than the other portion of the movable plate to allow for this increased thickness near one end of the bag bunch.

horns. At about this time the second transfer mechanism grips the bags and commences to remove the bunch and draw the knot tight. The needles have retreated clear of the bags, leaving a thread stretch $t^7$ passing through the bags and between the cutter blades 317 and 318, and at a suitable moment after the needle points have gotten back of the cutters they are operated to cut the threads, leaving a new pair of thread ends $t'$ projecting from the needle eyes, and these ends are pushed to one side by the fingers 335 ready for the next needle movement in the next ensuing cycle of the machine, as previously more fully explained.

Meantime the upward movement of the stripper hooks 433 and the upward movement of the bag bunch has tensioned portions of the thread forming the knot between the bag bunch and the hooks and under the stripper fingers 450, which yield upward somewhat against the springs 456 until the portions of the thread held by the hooks are pulled away from the hooks and the knot is free. At this moment or before the knot has tightened, the hooks 422 have pulled the thread ends $t'$ entirely through the second loop, as shown in full lines in Fig. 27, or else in some cases, depending on the adjustment of the machine or operating conditions, a bight of the thread may be left within the second loop, as shown in dotted lines in Fig. 27, the knot formed in this case being a releasable bow-knot, instead of a hard-tied knot. Either condition is satisfactory in some cases, and the exact form of the knot depends on adjustment and operating conditions.

The fastened bag bunch is carried onward by the second transfer device and discharged into the hopper or located in the discharge holders 151 and 154, in the manner previously described.

In some cases the final pull on the thread before it is cut pulls the knots $k$, Fig. 3, around from the central position in which they are shown, more or less against or slightly into the fabric of the outermost bag, but the exact location of the knot at the end of the fastening operation depends largely on the adjustment of the machine and operating conditions, and to a considerable extent the exact location and the exact form of the knot is immaterial.

At a suitable time before the commencement of the next cycle the spindles are raised to the original level and rotated another half turn to original position by the action of the gear segments on the cam body 330, and the other parts are all restored to the initial positions by the action of the respective cam grooves in a manner which will be sufficiently obvious without detailed explanation.

Evidently in some cases a single fastening thread will be sufficient, and in that case a single needle and knotter mechanism will be sufficient, but as previously stated, it is usually desired to provide two fastenings for the sake of greater security and to prevent relative twisting of the bags in the bunch.

The machine operates automatically and rapidly and with little attention, and handles the product of a multiplicity of stringing machines. Whenever a bag bunch is not presented in the fastening holder the needle carriage is rendered inoperative in the manner previously described, and, therefore, any trouble which might otherwise be caused by presenting the threads to the knotters in the absence of bags is avoided without the necessity of stopping the entire machine.

What I claim is:—

1. Bag fastening mechanism comprising a conveyor, having spaced holders, each adapted to support a bunch of fabric bags in flatwise contact, means for positioning a bunch of bags for fastening, means for transferring successive bunches of bags from the conveyor holders to the positioning means, and means for passing a fastening thread through the bag bunch and securing the thread.

2. Bag fastening mechanism comprising a conveyor having spaced holders, each adapted to support a bunch of fabric bags in flatwise contact, means for positioning a bunch of bags for fastening, means for transferring successive bunches of bags from the conveyor holders to the positioning means, means for passing a fastening thread through the bag bunch and securing the thread, and means for discharging the bunches successively from the positioning means.

3. Bag fastening mechanism comprising a conveyor having spaced holders, each adapted to support a bunch of fabric bags in flatwise contact, means for positioning a bunch of the bags for fastening, means for transferring successive bunches of bags from the conveyor holders to the positioning means, a needle, means for supplying a thread to the needle, means for passing the needle through the bag bunch and retracting it, means for shifting the bag bunch and the needle relatively, means for passing a needle through the bunch after the shifting movement to carry the thread through the bunch again and produce a bag loop in the thread at one side of the bunch, and means for fastening the thread at the other side of the bunch.

4. Bag fastening mechanism comprising a conveyor having spaced holders, each adapted to support a bunch of fabric bags in flatwise contact, means for positioning a bunch of the bags for fastening, means for transferring successive bunches of bags The bunch of bags B having been placed in the fastening holder by the first transfer device, in a manner previously described, while the fastening holder is maintained in upward position, Fig. 17, the needle carriage is advanced and the needles pass through the bags just after the primary presser feet 280 have compressed the bag bunch, as shown in that figure. The free end $t'$ of each thread $t$ lies back along its needle shank, as shown in Fig. 19. At this time the knotter spindles are in the position shown in Fig. 19, that is with the clamping bars 355 at the side toward the bags, and the spindles are also elevated and the clamping fingers 357 are raised above the clamping faces of the spindles so that the thread ends $t'$ run under the clamping fingers. The point ends of the needles are partly accommodated within the recesses 363. While the needles are in the position indicated in Fig. 19, the rotation of cam body 330 and the contour of cam groove 392 causes the shifter block 390 to descend slightly from the position of Fig. 17. The expansion of spring 396 thereupon moves the collar 394 downward, and by its connection with the clamping bar 355 the clamping finger 357 is moved down and grips the thread against the clamping surface of the spindle just before the needle carriage commences its first retreat. This movement of the needle produces a first knot loop $l$ (Fig. 20) in the thread, and the looper horn 359 is moved up through this loop by the further rotation of cam body 330 and the conformation of cam body 383 acting on the shiftable block 380 to raise the looper bar 356. The loop $l$ is then located around the outer surface of the primary horn 359 and of the secondary horn 360. The needle points then retreat clear of the knotters (Fig. 21) tightening the loop about the horn, and the thread is then drawn through the needle eye until the needle points are clear of the bags. When or shortly after the needles are clear of the knotters the knotter spindles are rotated one-half turn by the action of the gear segments 369 and 372 to the position of Fig. 22, completing the formation of the loop $l$ about the horns with a portion $t^2$ of the thread overlying the main stretch of the free end $t'$. At or about this time the holder 40 is moved downward to the position of Fig. 12. Just prior to this movement the thread is tensioned through the bags between the gripper and the needle points and the downward movement of the holder causes the thread to snap past the rounded stops 286 in the primary presser feet and to assume the diagonal position shown in Fig. 12. At or about this time also the descending movement of the holder 40 permits the secondary presser feet 300 to move inward toward the bags over the cam surfaces 310 of clamping plate 165 and grip the bag bunch and make a slight bend in the thread at $t^3$ and hold the thread tight against the bags and prevent the thread from slipping back as the needle carriage commences its second forward stroke. During the first part of this stroke the stops 286 retain the threads and create a sufficient slack of thread to form thread stretches $t^4$, Fig. 23, lying at the near side of the bag bunch, that is the side toward the needle carriage, this part of the thread being called sometimes for convenient identification, the bag loop or loop of the thread overlying the bags at one side in distinction from the loops formed in the knotting operation. The thread is then properly tensioned by the action of the tension cam plates 268 and is snapped away from the stops 286 and laid along the bags in the position of Fig. 23 as the needle points again go through the bag bunch in the line of movement indicated in Fig. 23. At a suitable time prior to the approach of the needle points to the knotters in their second advance the knotter spindles 354 are caused to descend slightly by the contour of cam groove 392 so that the needles now pass through the lower part of the aperture 361 between the primary and secondary looper horns carrying the thread through the first knot loop $l$, and the needle then passes through the recess 363 and commences to return, forming the second knot loop $l^2$, Fig. 24.

The knotter hook 422 and lifter hook 433 are shown in Fig. 24 in a plane at a right angle to their true position, for explanatory purposes, but are shown in correct relation to the other parts of the mechanism in the other figures. These hooks have been, up to the present moment, in elevated position away from the knotters, but they are now lowered toward the upper ends of the spindles by descent of the cross head 410, due to the conformation of cam groove 413 acting on roller 412. The lifter hook engages under a thread portion $t^5$ forming a part of the first loop and the knotter hook 422 passes down close to the needle and between the needle and thread portion $t^6$ close to where it is gripped by the clamping finger 357, and engages under this thread portion. The hooks are then raised with the knotter hook 422 moving ahead of the other hook, due to the sleeves 430 being held down by springs 439, to about the position shown in Fig. 26, bringing the thread portion $t^6$ up through the second loop. Meantime at a suitable point in the series of operations the clamp fingers 357 are raised to release the threads; the looper horn is withdrawn downward in one or two steps; the bag holder 40 rises; the lifter hooks 433 are raised above the level of the knotter hooks by the lug 447 engaging the extension 446 of lever 442 and raising the sleeves 430 to cause the hooks 433 to aid in stripping the knots off the from the conveyor holders to the positioning means, a needle, means for supplying a thread to the needle, means for passing the needle through the bag bunch and retracting it, means for shifting the bag bunch and the needle relatively, means for passing a needle through the bunch after the shifting movement to carry the thread through the bunch again and produce a bag loop in the thread at one side of the bunch, means for fastening the thread at the other side of the bunch, means for cutting the thread, and means for discharging the fastened bunch from the positioning means.

5. A bag fastening machine comprising a bag holder adapted to hold a bunch of fabric bags for fastening, a needle carriage, a needle thereon, means for moving the carriage to advance the needle twice through a bunch of bags positioned in the holder in each cycle of the machine, and means for shifting the holder between the advance movements of the carriage.

6. A bag fastening machine comprising a bag holder adapted to hold a bunch of fabric bags for fastening, a needle carriage, a needle thereon, means for moving the carriage to advance the needle twice through a bunch of bags positioned in the holder in each cycle of the machine, means for shifting the holder between the advance movements of the carriage, and means at the side of the holder opposite to the needle to tie portions of a thread passed through the bunch by the successive needle movements.

7. A bag fastening machine comprising a bag fastening holder, a needle carriage, two needles thereon, means for moving the carriage to advance the needles twice through a bunch of bags positioned in the holder in each cycle of the machine, and means for shifting the holder between the advance movements of the carriage.

8. A bag fastening machine comprising a bag fastening holder, a needle carriage, two needles thereon, means for moving the carriage to advance the needles twice through a bunch of bags positioned in the holder in each cycle of the machine, means for shifting the holder between the advance movements of the carriage, and means at the side of the holder opposite to the needles to tie portions of threads passed through the bunch by the successive needle movements.

9. A bag fastening machine comprising a bag holder including a movable bag bunch clamping member, means for moving said member, a needle carriage, a needle therein, means for moving the carriage to and fro twice in each cycle of the machine, and means for shifting the bag holder between the advance movements of the carriage.

10. A bag fastening machine comprising a bag holder including a movable bag bunch clamping member, means for moving said member, a needle carriage, a needle therein, means for moving the carriage to and fro twice in each cycle of the machine, means for shifting the bag holder between the advance movements of the carriage, and means for automatically supplying successive bunches of bags to the holders.

11. A bag fastening machine comprising a bag holder including a movable bag bunch clamping member, means for moving said member, a needle carriage, a needle therein, means for moving the carriage to and fro twice in each cycle of the machine, means for shifting the bag holder between the advance movements of the carriage, means for automatically supplying successive bunches of bags to the holder, and means for automatically discharging the fastened bunches of bags from the holder.

12. A bag fastening machine comprising a bag holder including a movable bag bunch clamping member, means for moving said member, a needle carriage, a needle therein, means for moving the carriage to and fro twice in each cycle of the machine, means for shifting the bag holder between the advance movements of the carriage, means for discharging fastened bunches of bags from the holder, and means for automatically inserting a fresh bunch of bags in the holder after each fastened bunch is discharged.

13. A bag fastening machine comprising a bag holder including a movable clamping member, means for moving said member, a needle carriage, two needles therein, means for moving the carriage to and fro twice in each cycle of the machine, and means for shifting the bag holder between the advance movements of the carriage.

14. A bag fastening machine comprising a bag holder including a movable clamping member, means for moving said member, a needle carriage, two needles therein, means for moving the carriage to and fro twice in each cycle of the machine, means for shifting the bag holder between the advance movements of the carriage, and means for automatically supplying successive bunches of bags to the holder.

15. A bag fastening machine comprising a bag holder including a movable clamping member, means for moving said member, a needle carriage, two needles therein, means for moving the carriage to and fro twice in each cycle of the machine, means for shifting the bag holder between the advance movements of the carriage, means for automatically supplying successive bunches of bags to the holder, and means for automatically discharging the fastened bunches of bags from the holder.

16. A bag fastening machine comprising a bag holder including a movable clamping member, means for moving said member, a needle carriage, two needles therein, means for moving the carriage to and fro twice in each cycle of the machine, means for shifting the bag holder between the advance movements of the carriage, means for discharging the fastened bunches of bags from the holder, and means for automatically inserting a fresh bunch of bags in the holder after each fastened bunch is discharged.

17. A bag fastening machine comprising a holder to position a bunch of bags for fastening, a continuously moving bag conveyor having spaced holders for successive bunches of bags and transfer mechanism for moving the successive bunches from the conveyor holders to the fastening holder, said transfer mechanism comprising bag grippers having an axis of oscillation, means for opening and closing the grippers, means for shifting the axis of oscillation to move the grippers with the conveyor while in operative relation thereto, and means for moving the grippers about their axis of oscillation to carry the bag bunch from the conveyor to the fastening holder.

18. A bag fastening machine comprising a holder to position a bunch of bags for fastening, a continuously moving bag conveyor having spaced holders for successive bunches of bags, each holder comprising curved bag-holding fingers, transfer mechanism for moving the successive bunches of the conveyor holders to the fastening holder, said transfer mechanism comprising bag grippers having an axis of oscillation, means for opening and closing the grippers, means for shifting the axis of oscillation to move the grippers with the conveyor while in operative relation thereto, and means for moving the grippers about their axis of oscillation to carry the bag bunch from the conveyor to the fastening holder.

19. A bag fastening machine comprising a holder in which a bunch of bags is positioned for fastening, discharge mechanism comprising an oscillating gripper carrier, bag grippers therein, means for oscillating the carrier, and means for opening and closing the grippers.

20. A bag fastening machine comprising a holder in which a bunch of bags is positioned for fastening, fastening means, discharge mechanism comprising an oscillating gripper carrier, bag grippers therein, means for oscillating the carrier, and means for opening and closing the grippers.

21. A bag fastening machine comprising a holder in which a bunch of bags is positioned for fastening, discharge mechanism comprising an oscillating gripper carrier, bag grippers therein, means for oscillating the carrier, means for opening and closing the grippers, and a holder to receive successively bunches of bags from said discharge mechanism.

22. A bag fastening machine comprising a holder in which a bunch of bags is positioned for fastening, fastening means, discharge mechanism comprising an oscillating gripper carrier, bag grippers therein, means for oscillating the carrier, means for opening and closing the grippers, and a holder to receive successively bunches of bags from said discharge mechanism.

23. A bag fastening machine comprising means for positioning and fastening a bunch of fabric bags, a receiving holder to receive fastened bag bunches, and means for transferring the bunches of bags from the fastening holder to the receiving holder.

24. A bag fastening machine comprising means for positioning a bunch of fabric bags, means for inserting a thread to fasten the bunch, a receiving holder to receive fastened bag bunches, and means for transferring the bunches of bags from the fastening holder to the receiving holder.

25. A bag fastening machine comprising a fastening holder in which bunches of bags are positioned for fastening, means for fastening the bags positioned therein, a discharge hopper, and transfer mechanism for transferring the fastened bunches of bags from the fastening holder to said hopper.

26. A bag fastening machine comprising a fastening holder in which bunches of bags are positioned for fastening, means for fastening the bags positioned therein, a discharge hopper, a bag receiving means above the hopper, and transfer mechanism for transferring the fastened bunches of bags from the fastening holder to said receiving means.

27. A bag fastening machine comprising means for positioning successive bunches of bags for fastening, means for fastening together the bags of the bunches so positioned, and means rendering the fastening means inoperative in the absence of a bunch of bags.

28. A bag fastening machine comprising means for positioning successive bunches of bags for fastening, means for fastening together the bags of the bunches so positioned, and means rendering the fastening means operative in the presence of a bunch and inoperative in the absence of a bunch of bags.

29. A bag fastening machine comprising a fastening holder, a conveyor, fastening means for operating upon a bunch of bags positioned in said holder, transfer mechanism for moving successive bunches of bags from the conveyor to said holder, and means acting in the absence of a bunch of bags at a certain position to render said fastening means inoperative.

30. A bag fastening machine comprising a fastening holder, a conveyor, fastening means for operating upon a bunch of bags positioned in said holder, transfer mechanism for moving successive bunches of bags from the conveyor to said holder, and means acting in the absence of a bunch of bags in said transfer mechanism to render the fastening means inoperative.

31. A bag fastening machine comprising a fastening holder, a conveyor, fastening means for operating upon a bunch of bags positioned in said holder, transfer mechanism for moving successive bunches of bags from the conveyor to said holder, and means acting in the absence of a bunch of bags at a certain position to render said fastening means inoperative, or in the presence of a bunch of bags to render said fastening means operative.

32. A bag fastening machine comprising a fastening holder, a conveyor, fastening means for operating upon a bunch of bags positioned in said holder, transfer mechanism for moving successive bunches of bags from the conveyor to said holder, means for controlling the fastening means, and means acted upon by a bunch of bags positioned in said transfer mechanism to render the fastening means operative to fasten the stated bunch of bags.

33. A bag fastening machine comprising a fastening holder, a conveyor, thread-inserting means, means for operating upon a bunch of bags positioned in said holder, transfer mechanism for moving successive bunches of bags from the conveyor to said holder, and means acting in the absence of a bunch of bags from normal position to render said thread inserting means inoperative.

34. A bag fastening machine comprising a fastening holder, a conveyor, thread-inserting means for operating upon a bunch of bags positioned in said holder, transfer mechanism for moving successive bunches of bags from the conveyor to said holder, and means acting in the absence of a bunch of bags in said transfer mechanism to render the fastening means inoperative.

35. A bag fastening machine comprising a fastening holder, a conveyor, thread-inserting means, means for operating upon a bunch of bags positioned in said holder, transfer mechanism for moving successive bunches of bags from the conveyor to said holder, means for controlling the movement of the fastening means, and means acted upon by a bunch of bags positioned in said transfer mechanism to render the fastening means operative to fasten the stated bunch of bags.

36. Bag fastening mechanism comprising a holder to position a bunch of bags for fastening, a bag conveyor, transfer mechanism to move successive bunches of bags from the conveyor to the holder, a needle carriage, means for moving the carriage to perform fastening operations upon the bags, a feeler controlled by a bunch of bags moving toward the holder, and means controlled by the feeler for rendering the carriage operative in the presence of a bunch of bags, and inoperative in the absence of a bag bunch.

37. Bag fastening mechanism comprising a holder to position a bunch of fabric bags for fastening, a bag conveyor, transfer mechanism to move successive bunches of bags from the conveyor to the fastening holder, a needle carriage, means for moving the carriage to perform fastening operations upon the bags, a feeler, controlled by a bunch of bags positioned in the transfer mechanism, means controlled by the feeler for rendering the carriage operative in the presence of a bunch of bags, and inoperative in the absence of a bag bunch.

38. Bag fastening mechanism comprising a bag fastening holder, a needle carriage, means for moving the carriage to and fro twice in relation to the holder in each cycle of the machine, a bag bunch carrier to position a bunch of bags in the holder, and means acting in the presence of a bunch of bags at a predetermined position to render the carriage operating mechanism operative throughout that cycle of the machine.

39. Bag fastening mechanism comprising a bag fastening holder, a needle carriage, means for moving the carriage to and fro twice in relation to the holder in each cycle of the machine, a bag bunch carrier to position a bunch of bags in the holder, and means acting in absence of a bunch of bags in a predetermined position to render the carriage operating mechanism inoperative throughout that cycle of the machine.

40. Bag fastening mechanism comprising a bag fastening holder, a needle carriage, means for moving the carriage to and fro twice in relation to the holder in each cycle of the machine, a bag bunch carrier to position a bunch of bags in the holder, and means acting in the presence of a bunch of bags in the carrier to render the carriage operating mechanism operative throughout that cycle of the machine.

41. Bag fastening mechanism comprising a bag fastening holder, a needle carriage, means for moving the carriage to and fro twice in relation to the holder in each cycle of the machine, a bag bunch carrier to position a bunch of bags in the holder, and means acting in absence of a bunch of bags in the carrier to render the carriage operating mechanism inoperative throughout that cycle of the machine.

42. Bag fastening mechanism comprising a bag fastening holder, a needle carriage, means for moving the carriage to and fro twice in relation to the holder in each cycle of the machine, a bag conveyor, transfer mechanism for removing successive bunches from the conveyor to the fastening holder, and means acting in the presence of the bunch of bags in the transfer mechanism to render the carriage driving mechanism operative throughout that cycle of the machine.

43. Bag fastening mechanism comprising a bag fastening holder, a needle carriage, means for moving the carriage to and fro twice in relation to the holder in each cycle of the machine, a bag conveyor, transfer mechanism for removing successive bunches from the conveyor to the fastening holder, and means acting in the absence of a bunch of bags in said transfer mechanism to render said carriage operating mechanism inoperative throughout that cycle of the machine.

44. Bag fastening mechanism comprising a bag fastening holder, a needle carriage, means for moving the carriage to and fro twice in relation to the holder in each cycle of the machine, a bag conveyor having spaced holders for bunches of bags, transfer mechanism for removing successive bunches from the conveyor holders to the fastening holder, and means acting in the presence of the bunch of bags in the transfer mechanism to render the carriage driving mechanism operative throughout that cycle of the machine.

45. Bag fastening mechanism comprising a bag fastening holder, a needle carriage, means for moving the carriage to and fro twice in relation to the holder in each cycle of the machine, a bag conveyor having spaced holders for bunches of bags, transfer mechanism for removing successive bunches from the conveyor holders to the fastening holder, and means acting in the absence of a bunch of bags in said transfer mechanism to render said carriage operating mechanism inoperative throughout that cycle of the machine.

46. Bag fastening mechanism comprising means for positioning a bunch of bags for fastening, a needle carriage, guides supporting the carriage for to and fro movement, a rack on the carriage, another rack supported for to and fro movement, a pinion engaging the racks, means for moving the pinion to and fro, and means for holding the last named rack as an abutment to cause the pinion to move the carriage.

47. Bag fastening mechanism comprising means for positioning a bunch of bags for fastening, a needle carriage, guides supporting the carriage for to and fro movement, a rack on the carriage, another rack supported for to and fro movement, a pinion engaging the racks, means for moving the pinion to and fro, and retractable means for holding said second rack to cause the pinion to move the carriage or to permit the carriage to be stationary while the pinion moves said second rack.

48. Bag fastening mechanism comprising means for positioning a bunch of bags for fastening, a needle carriage, guides supporting the carriage for to and fro movement, a rack on the carriage, another rack supported for to and fro movement, a pinion engaging the racks, means for moving the pinion to and fro, and shiftable stop mechanism to hold said second rack while the carriage is free or to hold the carriage while the said second rack is free.

49. Bag fastening mechanism comprising means for positioning a bunch of bags for fastening, a needle carriage, guides supporting the carriage for to and fro movement, a rack on the carriage, another rack supported for to and fro movement, a pinion engaging the racks, means for moving the pinion to and fro, retractable means for holding said second rack to cause the pinion to move the carriage or to permit the carriage to be stationary while the pinion moves said second rack, means for shifting said retractable means, and a detent for said shifting means controlled by the presence or absence of a bunch of bags at a stated position in the mechanism.

50. Bag fastening mechanism comprising means for positioning a bunch of bags for fastening, a needle carriage, guides supporting the carriage for reciprocating movement, a rack on the carriage, another rack supported for reciprocating movement, a pinion mounted between the racks and engaging both of them, means for moving the pinion to and fro, and means for holding the last named rack as an abutment to cause the pinion to move the carriage.

51. Bag fastening mechanism comprising means for positioning a bunch of bags for fastening, a needle carriage, guides supporting the carriage for reciprocating movement, a rack on the carriage, another rack supported for reciprocating movement, a pinion mounted between the racks and engaging both of them, means for moving the pinion to and fro, and retractable means for holding said second rack to cause the pinion to move the carriage or to permit the carriage to be stationary while the pinion moves said second rack.

52. Bag fastening mechanism comprising means for positioning a bunch of bags for fastening, a needle carriage, guides supporting the carriage for reciprocating movement, a rack on the carriage, another rack supported for reciprocating movement, a pinion mounted between the racks and engaging both of them, means for moving the pinion to and fro, and shiftable stop mechanism to hold said second rack while the carriage is free or to hold the carriage while the said second rack is free.

53. Bag fastening mechanism comprising means for positioning a bunch of bags for fastening, a needle carriage, guides supporting the carriage for reciprocating movement, a rack on the carriage, another rack supported for reciprocating movement, a pinion mounted between the racks and engaging both of them, means for moving the pinion to and fro, shiftable stop mechanism to hold said second rack while the carriage is free or to hold the carriage while the said second rack is free, and means for shifting the stop mechanism and a detent for said shifting means controlled by the presence or absence of a bunch of bags at a stated position in the mechanism.

54. Bag fastening mechanism comprising a holder in which bunches of bags are positioned for fastening, a needle carriage arranged for to and fro movement, means for moving the carriage to and fro twice in each cycle of the machine, a shiftable member controlling the carriage movement, means for shifting said member, and means for retaining said member in one of its positions throughout the cycle of the machine to insure operativeness or inoperativeness of the carriage throughout the cycle.

55. Bag fastening mechanism comprising a holder in which bunches of bags are positioned for fastening, a needle carriage arranged for to and fro movement, means for moving the carriage to and fro twice in each cycle of the machine, a shiftable member controlling the carriage movement, means for shifting said member, and means controlled by presence or absence of a bunch of bags for retaining said member in one or the other of its positions throughout the cycle of the machine to insure operativeness or inoperativeness of the carriage throughout the cycle.

56. Bag fastening mechanism comprising a holder in which bunches of bags are positioned for fastening, a needle carriage arranged for to and fro movement, means for moving the carriage to and fro twice in each cycle of the machine, a shiftable member controlling the carriage movement, a cam follower connected to move said shiftable member, a two-track cam cooperating with said cam follower, and means for positioning the cam follower to cause it to follow one or the other of the cam tracks which controls the follower until the completion of that cycle of the machine.

57. Bag fastening mechanism comprising a holder in which bunches of bags are positioned for fastening, a needle carriage arranged for to and fro movement, means for moving the carriage to and fro twice in each cycle of the machine, a shiftable member controlling the carriage movement, a cam follower connected to move said shiftable member, a two-track cam cooperating with said cam follower, one cam track being arranged to shift said member and normally to permit it to return quickly at one point near the beginning of the machine cycle, and means normally acting when the cam follower is shifted to prevent its return movement whereupon the second cam track controls the follower until the completion of that cycle of the machine.

58. Bag fastening mechanism comprising a fastening holder in which bunches of bags are positioned for fastening, a needle carriage arranged for to and fro movement, means for moving the carriage to and fro twice in each cycle of the machine, a shiftable member controlling the movement of said carriage, a cam follower connected to move said member, a cam having an outer circular interrupted track and an inner track having a hump at said interruption, said hump serving to move the cam follower in operative relation to the outer track in each cycle of the machine, and detent mechanism controllable at the time the follower is elevated to cause it to follow the outer track or to permit it to return and follow the inner cam track.

59. Bag fastening mechanism comprising a fastening holder, in which bunches of bags are positioned for fastening, a needle carriage arranged for to and fro movement, means for moving the carriage to and fro twice in each cycle of the machine, a shiftable member controlling the movement of said carriage, a cam follower connected to move said member, a cam having an outer circular interrupted track and an inner track having a hump at said interruption, said hump serving to elevate the cam follower in operative relation to the outer track in each cycle of the machine, and detent mechanism controlled by a bag bunch at the time the follower is elevated to cause it to follow the outer track and to permit it to return and follow the inner cam track.

60. Bag fastening mechanism comprising a fastening holder in which bunches of bags are positioned for fastening, a needle carriage arranged for to and fro movement, means for moving the carriage to and fro twice in each cycle of the machine, a shiftable member controlling the movement of said carriage, a cam follower connected to move said member, a cam having an outer circular interrupted track and an inner track having a hump at said interruption, said hump serving to move the cam follower in operative relation to the outer track in each cycle of the machine, detent mechanism controllable at the time the follower is elevated to cause it to follow the outer track or to permit it to return and follow the inner cam track, means for advancing a bunch of bags to the holder in each cycle of the machine, and feeler mechanism actuated by the bag bunches to control said detent mechanism.

61. Bag fastening mechanism comprising a holder in which a bunch of bags is positioned for fastening, said holder having a clamping plate provided with a slot, a needle carriage, means for reciprocating the carriage, a needle on the carriage, a bag compressing member arranged to accommodate the needle and to engage and compress the bags substantially at the point of needle entry, a plunger supporting said member, a guide therefor on the carriage, a spring yieldingly holding said member in advance of the carriage, and a stop to limit forward movement of said member in relation to the carriage.

62. Bag fastening mechanism comprising a holder in which a bunch of bags is positioned for fastening, said holder having a clamping plate provided with a slot, a needle carriage, means for reciprocating the carriage, a needle on the carriage, a bag compressing member arranged to accommodate the needle and to engage and compress the bags substantially at the point of needle entry, a plunger supporting said member, a guide therefor on the carriage, a spring yieldingly holding said member in advance of the carriage, a stop to limit forward movement of said member in relation to the carriage, means for shifting said bag holder, and a thread stop in said presser member to tension the thread and control it to aid in forming a bag loop in the fastening thread.

63. Bag fastening mechanism comprising a holder in which a bunch of bags is positioned for fastening said holder having a movable clamping plate provided with a slot, a needle carriage, means for reciprocating the carriage, a needle on the carriage, a bag compressing member having a loop portion to accommodate the needle, and arranged to engage and compress the bags substantially at the point of needle entry, a plunger supporting said member, guides therefor on the carriage, a spring yieldingly holding said member in advance of the carriage, and a stop to limit forward movement of said member in relation to the carriage.

64. Bag fastening mechanism comprising a holder in which a bunch of bags is positioned for fastening said holder having a movable clamping plate provided with a slot, a needle carriage, means for reciprocating the carriage, a needle on the carriage, a bag compressing member having a loop portion to accommodate the needle and arranged to engage and compress the bags substantially at the point of needle entry, a plunger supporting said member, guides therefor on the carriage, a spring yieldingly holding said member in advance of the carriage, a stop to limit forward movement of said member in relation to the carriage, means for shifting said bag holder, and a thread stop in said presser member to tension the thread and control its movements to aid in forming a bag loop in the fastening thread.

65. Bag fastening mechanism comprising a bag holder, means for shifting the holder, a needle carriage, a needle thereon, means for supplying thread to the needle, means for shifting the carriage, and a movable presser member acting on advance movement to compress the bags and retain the thread at the point of compression.

66. Bag fastening mechanism comprising a bag holder, means for shifting the holder, a needle carriage, a needle thereon, means for supplying thread to the needle, means for shifting the carriage, and a movable member acting on advance movement to compress the bags and retain the thread at the point of compression, said member being actuated by shifting movement of the holder.

67. Bag fastening mechanism comprising a bag holder, means for shifting the holder, a needle carriage, a needle thereon, means for supplying thread to the needle, means for moving the carriage, and a presser member arranged to compress a bag bunch in the holder and hold the thread substantially at the point of compression.

68. Bag fastening mechanism comprising a bag holder, means for shifting the holder, a needle carriage, a needle thereon, means for supplying thread to the needle, means for moving the carriage, and a presser member arranged to compress the bag bunch in the holder and hold the thread substantially at the point of compression, said presser member being actuated by movement of the holder.

69. Bag fastening mechanism comprising a bag holder having a slotted plate formed with a cam surface at one end of the slot, means for shifting the holder, a needle carriage, a needle thereon, means for supplying thread to the needle, means for moving the carriage, and a presser member arranged to enter said slot, compress the bag bunch in the holder, and hold the thread substantially at the point of compression, said presser member being arranged to cooperate with said cam surface.

70. Bag stringing mechanism comprising a bag holder having a movable clamping plate, means for moving said plate, means for shifting the holder, a needle carriage, a needle thereon, means for supplying thread to the needle, means for moving the carriage to and fro, knotter mechanism adjacent to the holder, means for positioning bunches of bags successively in the holder, and means for removing the bunches of bags after fastening.

71. Bag stringing mechanism comprising a bag holder having a movable clamping plate, means for moving said plate, means for shifting the holder, a needle carriage, a needle thereon, means for supplying thread to the needle, means for moving the carriage to and fro twice in each cycle of the machine, knotter mechanism adjacent to the holder, means for positioning bunches of bags successively in the holder, and means for removing the bunches of bags after fastening.

72. Bag stringing mechanism comprising a bag holder having a movable clamping plate, means for moving said plate, means for shifting the holder, a needle carriage, needles thereon, means for supplying threads to the needles, means for moving the carriage to and fro, knotter mechanisms adjacent to the holder, means for positioning bunches of bags successively in the holder, and means for removing the bunches of bags after fastening.

73. Bag stringing mechanism comprising a bag holder having a movable clamping plate, means for moving said plate, means for shifting the holder, a needle carriage, needles thereon, means for supplying threads to the needles, means for moving the carriage to and fro twice in each cycle of the machine, knotter mechanisms adjacent to the holder, means for positioning bunches of bags successively in the holder, and means for removing the bunches of bags after fastening.

74. Bag fastening mechanism comprising means for holding a bunch of fabric bags in flatwise contact for fastening, means for positioning the bunches of bags successively in the holder, means for passing a fastening thread through the bunch of bags in the holder, means for shifting the holder to form a bag loop in the thread, means for passing the thread again through the bag bunch, means for knotting the thread, means for cutting the thread, and means for discharging the fastened bunches successively from the holder.

75. Bag fastening mechanism comprising means for holding a bunch of fabric bags in flatwise contact for fastening, means for positioning the bunches of bags successively in the holder, means for passing a fastening thread through the bunch of bags in the holder, means for shifting the holder to form a bag loop in the thread, means for passing the thread again through the bag bunch, means for knotting the thread, means for cutting the thread, means for discharging the fastened bunches successively from the holder, and means for compressing the bag bunch adjacent to each point of thread entry.

76. Bag fastening mechanism comprising means for holding a bunch of fabric bags in flatwise contact for fastening, means for positioning the bunches of bags successively in the holder, means for passing a fastening thread through the bunch of bags in the holder, means for shifting the holder to form a bag loop in the thread, means for passing the thread again through the bag bunch, means for knotting the thread, means for cutting the thread, means for discharging the fastened bunches successively from the holder, means for compressing the bag bunch adjacent to each point of thread entry, and additional pressing means for compressing the bunch and holding the portion of the thread first inserted during subsequent operations.

77. Bag handling and fastening mechanism comprising a fastening holder adapted to receive and position a bunch of bags, means for automatically advancing and positioning successive bunches of fabric bags in the holder, and means acting automatically after the positioning of each bag bunch to pass a thread through the bunch to secure the bags together.

78. Bag handling and fastening mechanism comprising a fastening holder adapted to receive and position a bunch of bags, means for automatically advancing and positioning successive bunches of fabric bags in the holder, means acting automatically after the positioning of each bag bunch to pass a thread through the bunch to secure the bags together, and means for moving the fastened bunches successively away from the fastening holder.

79. Bag handling and fastening mechanism, comprising a fastening holder, means for automatically advancing and positioning successive bunches of bags in the holder, and means acting automatically after the positioning of each bag bunch to pass a plurality of threads through the bunch to secure the bags together.

80. Bag handling and fastening mechanism, comprising a fastening holder, means for automatically advancing and positioning successive bunches of bags in the holder, means acting automatically after the positioning of each bag bunch to pass a thread through the bunch in two separate spaces, and to tie the thread so as to secure the bags of the bunch together.

81. Bag handling and fastening mechanism comprising a conveyor having spaced bag holders, each adapted to hold a bunch of fabric bags in flatwise contact, a fastening holder to position a bunch of bags for fastening, means for automatically transferring successive bag bunches from the conveyor holders to the fastening holder, and means for passing a thread through the bunch of bags supported in the fastened holder to secure the bags together.

82. Bag handling and fastening mechanism comprising a conveyor having spaced bag holders, each adapted to hold a bunch of fabric bags in flatwise contact, a fastening holder to position a bunch of bags for fastening, means for automatically transferring successive bag bunches from the conveyor holders to the fastening holder, means for passing a thread through the bunch of bags supported in the fastened holder to secure the bags together, and means for transferring the successive fastened bunches from the fastening holder to a discharge point.

83. Bag handling and fastening mechanism comprising a conveyor having spaced bag holders, each adapted to hold a bunch of fabric bags in flatwise contact, a fastening holder to position a bunch of bags for fastening, means for automatically transferring successive bag bunches from the conveyor holders to the fastening holder, means for passing a thread through the bunch of bags supported in the fastened holder to secure the bags together, means for transferring the successive fastened bunches from the fastening holder to a discharge point, and means acting automatically upon absence of a bunch of bags at a predetermined position in the mechanism anterior to fastening position to render the fastening means inoperative at a time corresponding to the time when said absent bunch would be positioned for fastening in the normal operation of the machine.

Signed at Durham in the county of Durham and State of North Carolina this first day of September A. D. 1922.

JOHN T. DALTON.